US012798989B2

(12) United States Patent
Ansari

(10) Patent No.: US 12,798,989 B2
(45) Date of Patent: Nov. 17, 2026

(54) BIODERIVED FERROMAGNETIC COBALT-FERRITE (COFE204) NANOPARTICLES

(71) Applicant: Imam Abdulrahman Bin Faisal University, Dammam (SA)

(72) Inventor: Mohammad Azam Ansari, Dammam (SA)

(73) Assignee: Imam Abdulrahman Bin Faisal University, Dammam (SA)

( * ) Notice: Subject to any disclaimer, the term of this patent is extended or adjusted under 35 U.S.C. 154(b) by 362 days.

(21) Appl. No.: 18/758,806

(22) Filed: Jun. 28, 2024

(65) Prior Publication Data

US 2026/0001777 A1 Jan. 1, 2026

(51) Int. Cl.

| | |
|---|---|
| ***C01G 49/00*** | (2006.01) |
| ***A01N 25/34*** | (2006.01) |
| ***A01N 59/16*** | (2006.01) |
| ***A01N 65/42*** | (2009.01) |
| *A01P 1/00* | (2006.01) |
| *A01P 15/00* | (2006.01) |

(52) U.S. Cl.

CPC ......... *C01G 49/0018* (2013.01); *A01N 25/34* (2013.01); *A01N 59/16* (2013.01); *A01N 65/42* (2013.01); *A01P 1/00* (2021.08); *A01P 15/00* (2021.08); *C01P 2002/01* (2013.01); *C01P 2002/32* (2013.01); *C01P 2002/72* (2013.01); *C01P 2002/82* (2013.01); *C01P 2002/85* (2013.01); *C01P 2004/03* (2013.01); *C01P 2004/04* (2013.01); *C01P 2004/32* (2013.01); *C01P 2004/45* (2013.01); *C01P 2004/64* (2013.01); *C01P 2006/42* (2013.01)

(58) Field of Classification Search

None

See application file for complete search history.

(56) References Cited

FOREIGN PATENT DOCUMENTS

| | | | |
|---|---|---|---|
| CN | 108013030 | * | 2/2018 |
| CN | 111744231 B | | 11/2021 |
| CN | 114524470 B | | 6/2023 |
| IN | 399000 | | 7/2020 |
| IN | 386292 | | 2/2021 |

OTHER PUBLICATIONS

Woo et al. (Cn 108013030; published: May 11, 18); English machine translation via Google Patents obtained on Aug. 21, 26. (Year: 2026).*

Dhanda et al. ; Green-synthesis of Ni-Co nanoferrites using aloe vera extract: Structural, optical, magnetic, and antimicrobial studies ; Applied Organometallic Chemistry, vol. 37, Issue 7 ; 1 Page ; Abstract Only.

Hermosa et al. ; Green Synthesis of Magnetic Ferrites (Fe304, CoFe204 , and NiFe204) Stabilized by Aloe Vera Extract For Cancer Hyperthermia Activities ; IEEE Transactions on Magnetics, vol. 58, Issue 8 ; Mar. 10, 2022 ; 1 Page ; Abstract Only.

Dogac et al. ; Inhibition of biofilm, quorum-sensing, and swarming motility in pathogenic bacteria by magnetite, manganese ferrite, and nickel ferrite nanoparticles ; Biotechnology and Applied Biochemistry ; Dec. 7, 2023 ; 1 Pages ; Abstract Only.

Phumying et al. ; Nanocrystalline spinel ferrite (MFe204, M = Ni, Co, Mn, Mg, Zn) powders prepared by a simple aloe vera plant-extracted solution hydrothermal route ; Materials Research Bulletin 48 ; Feb. 28, 2013 ; 6 Pages.

* cited by examiner

*Primary Examiner* — Genevieve S Alley

(74) *Attorney, Agent, or Firm* — Oblon, McClelland, Maier & Neustadt, L.L.P.

(57) ABSTRACT

A method of reducing a biofilm, including mixing a cobalt salt and an iron salt in water to form a solution. The method further includes adding an aloe vera extract to the solution and stirring for 1 hour to 10 hours at a temperature of 30 degrees Celsius (° C.) to 80 °C to form a gel. Heating the gel to form a foam, calcining the foam at a temperature of 600 °C to 1000 °C for 1 hour to 3 hours to form $CoFe_2O_4$ NPs, and contacting the $CoFe_2O_4$ NPs with a biofilm on a surface. The $CoFe_2O_4$ NPs reduce an amount of the biofilm after the contacting. The $CoFe_2O_4$ NPs have an average size of 5 nanometers (nm) to 35 nm. The $CoFe_2O_4$ NPs form aggregates having an average size of 500 micrometers (μm) to 1 μm.

19 Claims, 23 Drawing Sheets

BIODERIVED FERROMAGNETIC COBALT-FERRITE (COFE204) NANOPARTICLES

STATEMENT OF PRIOR DISCLOSURE BY INVENTOR

Aspects of the present disclosure are described in M. A. Ansari, R. Govindasamy, M. Y. Begum, M. Ghazwani, A. Alqahtani, M, N. Alomary, Y. F. Jamous, S. A. Alyahya, S. Asiri, F. A. Khan, M. A. Almessiere, and A. Baykal "Bio-inspired ferromagnetic $CoFe_2O_4$ nanoparticles: Potential pharmaceutical and medical applications"; Nanotechnology Reviews; 2023; 12; 1, incorporated herein by reference in its entirety.

STATEMENT OF ACKNOWLEDGEMENT

The support of the Deputyship for Research & Innovation, Ministry of Education in Saudi Arabia for funding this research work is gratefully acknowledged.

BACKGROUND

Technical Field

The present disclosure is directed to fabrication of cobalt-ferrite ($CoFe_2O_4$) nanoparticles (NPs) and, more particularly, to a method of fabricating $CoFe_2O_4$ nanoparticles (NPs) using Aloe vera leaf extract.

Description of Related Art

The "background" description provided herein is to present the context of the disclosure generally. Work of the presently named inventors, to the extent it is described in this background section, as well as aspects of the description that may not otherwise qualify as prior art at the time of filing, are neither expressly nor impliedly admitted as prior art against the present invention.

Ferrites with distinctive physical characteristics are explored for pharmaceutical and industrial purposes. Within these nanomaterials, cobalt-ferrite nanoparticles ($CoFe_2O_4$ NPs) exhibit properties such as strong overloaded magnetization without any favored ferromagnetic mechanism and good penetration. Further, the potential of $CoFe_2O_4$ NPs to form magnetized nanospheres, high magnetostriction, and good coupling efficiency make them an alternative for a plurality of applications in medicine. Magnetic NPs have superior characteristics as compared to traditional materials and are favorable for application in a plurality of pharmaceutical industry due to the microstructure and powerful magnetic storage. Furthermore, magnetic NPs are used in biomedical industries, including drug administration, electromagnetic resonance imaging, magneto-thermo drug delivery, hyperthermia, nanosensors, enzymatic therapy of gases, gas detection, and alkane oxidation.

The composition, structure, form, and general properties of magnetic ferrite NPs may depend on the production process. As a result, numerous chemical production methods, such as solvothermal, coprecipitation, hydrothermal, sol-gel, and combustion methods, are used to produce $CoFe_2O_4$ NPs. However, the abovementioned methods may be costly and detrimental to the environment.

Recently, sustainable and green NP synthesis techniques have been developed to minimize the abovementioned drawbacks. The green synthesis of $CoFe_2O_4$ NPs has several advantages over other chemical methods such as being environmentally friendly, provides a non-hazardous compatible solvent system, eco-friendly reducing agent, and a non-hazardous gelling agent for stabilizing the nanostructures. The use of plant extracts from leaves, seeds, roots, or flowers in the biosynthetic method of NP manufacturing has been reported. Plant extracts have a number of secondary metabolites, such as polyphenols, alkaloids, sugars, polysaccharides, amino acids, and vitamins which participate in the synthetic process.

Although a few green methods for the fabrication of $CoFe_2O_4$ NPs have been developed in the past, most of these methods are inefficient and the properties of the NPs vary depending on the plant extract used. Accordingly, a primary objective of the present disclosure is to fabricate $CoFe_2O_4$ NPs using a sustainable and environmentally friendly green chemistry technique that uses *Aloe vera* leaf extract as a reducing agent. Another object of the present disclosure is to use such NPs produced by the green method to reduce biofilm formation.

SUMMARY

In an exemplary embodiment, a method of reducing a biofilm with prepared cobalt-ferrite ($CoFe_2O_4$) nanoparticles (NPs) is described. The method includes mixing a cobalt salt and an iron salt in water to form a solution. The method further includes adding an Aloe vera extract to the solution and stirring for 1 hour (h) to 10 h at a temperature of 30 degrees Celsius (° C.) to 80 °C to form a gel. Afterward, the method includes heating the gel to form a foam and calcining the foam at a temperature of 600 °C to 1000 °C for 1 hour to 3 h to form $CoFe_2O_4$ nanoparticles (NPs). In some embodiments, the method further includes contacting the $CoFe_2O_4$ NPs with a biofilm on a surface, as such, the $CoFe_2O_4$ NPs reduce an amount of the biofilm after contacting the $CoFe_2O_4$ NPs with the biofilm. The $CoFe_2O_4$ NPs have an average size of 5 nanometers (nm) to 35 nm. The $CoFe_2O_4$ NPs form aggregates having an average size of 500 micrometers (μm) to 1 μm.

In some embodiments, the $CoFe_2O_4$ NPs are crystalline.

In some embodiments, the $CoFe_2O_4$ NPs have an inverse spinel structure.

In some embodiments, the $CoFe_2O_4$ NPs have a zeta potential of −15 millivolts (mV) to −20 mV.

In some embodiments, the $CoFe_2O_4$ NPs have a spherical shape.

In some embodiments, the $CoFe_2O_4$ NPs includes 15 percent by weight (wt. %) to 25 wt. % O, 40 wt. % to 50 wt. % Fe, and 30 wt. % to 40 wt. % Co, based on a total weight of the $CoFe_2O_4$ NPs.

In some embodiments, the method of calcining the foam removes phenolic compounds from a surface of the $CoFe_2O_4$ NPs, and the surface of the $CoFe_2O_4$ NPs has negatively charged hydroxyl groups.

In some embodiments, the $CoFe_2O_4$ NPs have a saturation magnetization of 40 electromagnetic unit per gram (emu/g) to 50 emu/g at 37 °C In another exemplary embodiment, a method of making the Aloe vera extract is described. The method includes cutting Aloe vera leaves into pieces having a longest dimension of less than 1 cm, mixing the pieces in water and boiling the pieces for at least 5 minutes to form an extract mixture. The method further includes separating the pieces from the extract mixture to form the Aloe vera extract.

In some embodiments, the $CoFe_2O_4$ NPs have a concentration of 0.125 milligrams per milliliter (mg/mL) to 1 mg per mL of the biofilm, during contacting the $CoFe_2O_4$ NPs with the biofilm.

In some embodiments, the $CoFe_2O_4$ NPs have a minimum inhibitory concentration (MIC) of 0.25 mg/mL to 1 mg/mL of the biofilm on contacting the $CoFe_2O_4$ NPs with the biofilm.

In some embodiments, the biofilm includes at least one selected from the group consisting of Methicillin-resistant *Staphylococcus aureus* (MRSA), *Candida albicans, Pseudomonas aeruginosa, Staphylococcus aureus, Escherichia coli*, Multidrug-Resistant *Pseudomonas aeruginosa* (MD R-PA), and *Candida parapsilosis.*

In some embodiments, in contacting the $CoFe_2O_4$ NPs with the biofilm, the $CoFe_2O_4$ NPs have a concentration of 0.5 mg/mL of the biofilm, and the $CoFe_2O_4$ NPs reduce an amount of a *Candida albicans* biofilm by at least 40%, 24 h after contacting the $CoFe_2O_4$ NPs with the *Candida albicans* biofilm.

In some embodiments, in contacting the $CoFe_2O_4$ NPs with the biofilm, the $CoFe_2O_4$ NPs have a concentration of 0.5 mg/mL of the biofilm, and the $CoFe_2O_4$ NPs reduce an amount of a *Pseudomonas aeruginosa* biofilm by at least 40%, 24 h after contacting the $CoFe_2O_4$ NPs with the *Pseudomonas aeruginosa* biofilm.

In some embodiments, in contacting the $CoFe_2O_4$ NPs with the biofilm, the $CoFe_2O_4$ NPs have a concentration of 0.5 mg/mL of the biofilm, and the $CoFe_2O_4$ NPs reduce an amount of a MRSA biofilm by at least 40%, 24 h after contacting the $CoFe_2O_4$ NPs with the MRSA biofilm.

In some embodiments, the surface is in a hospital.

In some embodiments, the $CoFe_2O_4$ NPs attach to a cell surface and at least partially penetrate and distort a membrane of the cell in the biofilm leading to cell death.

In some embodiments, the method further includes functionalizing a surface of the $CoFe_2O_4$ NPs with an antibacterial compound prior to contacting the $CoFe_2O_4$ NPs with the biofilm, where the antibacterial compound is covalently bound to the surface of the $CoFe_2O_4$ NPs.

In some embodiments, the method further includes functionalizing a surface of the $CoFe_2O_4$ NPs with a photosensitizer prior to contacting the $CoFe_2O_4$ NPs with the biofilm and irradiating the $CoFe_2O_4$ NPs with the photosensitizer after contacting the $CoFe_2O_4$ NPs with the biofilm to form reactive oxygen species. The photosensitizer is covalently bound to the surface of the $CoFe_2O_4$ NPs.

The foregoing general description of the illustrative present disclosure and the following detailed description thereof are merely exemplary aspects of the teachings of this disclosure and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein.

DETAILED DESCRIPTION

Figure 1A:
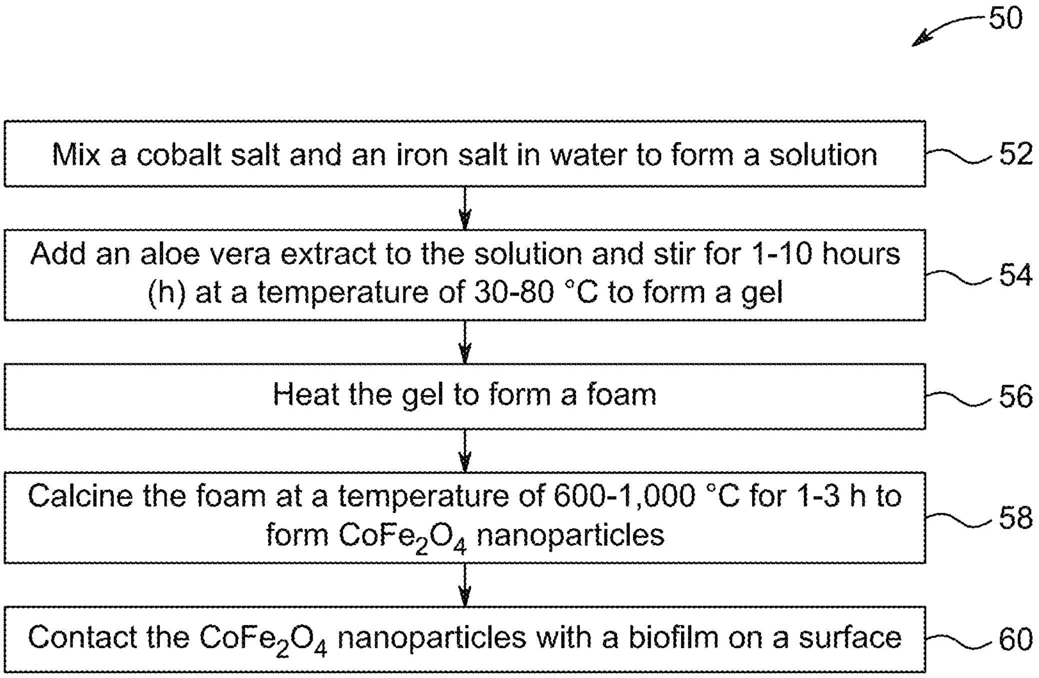
FIG. 1A is a flowchart illustrating a method for making the bioderived ferromagnetic cobalt-ferrite nanoparticles ($CoFe_2O_4$ NPs), according to certain embodiments.

When describing the present disclosure, the terms used are to be construed in accordance with the following definitions, unless a context dictates otherwise.

Embodiments of the present invention will now be described more fully hereinafter with reference to the accompanying drawings wherever applicable, in that some, but not all, embodiments of the disclosure are shown.

Where a numerical limit or range is stated herein, the endpoints are included. Also, all values and subranges within a numerical limit or range are specifically included as if explicitly written out.

In the drawings, like reference numerals designate identical or corresponding parts throughout the several views. Further, as used herein, the words "a," "an" and the like generally carry a meaning of "one or more," unless stated otherwise.

Furthermore, the terms "approximately", "approximate", "about," and similar terms generally refer to ranges that include the identified value within a margin of 20%, 10%, or preferably 5%, and any values therebetween.

The use of the terms "include," "includes", "including," "have," "has," or "having" should be generally understood as open-ended and non-limiting unless specifically stated otherwise.

As used herein, "particle size" may be thought of as the length or longest dimension of a particle.

A weight percent of a component, unless specifically stated to the contrary, is based on the total weight of the formulation or composition in which the component is included. For example, if a particular element or component in a composition or article is said to have 5 wt %, it is understood that this percentage is in relation to a total compositional percentage of 100%.

As used herein, "nanoparticles (NPs)" are particles having a particle size of 1 nm to 500 nm within the scope of the present invention.

As used herein, "sol-gel process" refers to a chemical synthesis method for materials, including resins, where an oxide network is developed through at least polycondensation reactions of a molecular precursor in a liquid. In the present case, the molecular precursors are the silane derivatives (alkoxysilanes). The finished product of a sol-gel synthesis process can be referred to as a "sol-gel material", a "sol-gel processed material", a "sol-gel product," or a "sol-gel processed product."

As used herein, the term 'hydroxyl group' refers to the functional group with the chemical formula-OH and composed of one oxygen atom covalently bonded to one hydrogen atom.

As used herein, "magnetic materials" refers to materials that get impacted by external electromagnetic fields in their surroundings.

As used herein, "ferromagnetic materials" refers to materials that demonstrate a spontaneous net magnetization at an atomic level despite the absence of an external magnetic field, and the materials acquire permanent magnetism.

As used herein, "crystallites" refers to tiny (generally microscopic) crystals that are bonded together by boundaries that are substantially irregular, including polycrystalline solids.

As used herein, "zeta potential" refers to a parameter that measures the electrochemical equilibrium at the particle-liquid interface.

As used herein, the term "biofilm" refers to a population of microorganisms that are concentrated at an interface (usually solid/liquid) and typically surrounded by an extracellular polymeric slime matrix. Biofilms may form on living or non-living surfaces and are found in natural, industrial, and hospital settings. Biofilms can contain many different types of microorganisms, e.g., bacteria, archaea, protozoa, fungi, and algae. Preferably, such biofilms comprise bacteria, microalgae (such as Prototheca spp.), or fungi.

As used herein, the term "minimum inhibitory concentration (MIC)" is the lowest concentration of an antimicrobial (like an antifungal, antibiotic or bacteriostatic) drug that will inhibit the visible growth of a microorganism after overnight incubation.

In addition, the present disclosure is intended to include all isotopes of atoms occurring in the present compounds and complexes. Isotopes include those atoms having the same atomic number but different mass numbers. By way of general example, and without limitation, isotopes of hydrogen include deuterium and tritium. Isotopes of oxygen include $^{16}O$, $^{17}O$, and $^{18}O$ and isotopes of cobalt (Co) are $^{56}Co$, $^{57}Co$, $^{58}Co$, and $^{60}Co$. Isotopically-labeled compounds of the disclosure may generally be prepared by conventional techniques known to those skilled in the art or by processes analogous to those described herein, using an appropriate isotopically-labeled reagent in place of the non-labeled reagent otherwise employed.

Aspects of the present disclosure are directed to develop a cost-effective, non-toxic, eco-friendly, and simple approach for the green synthesis of $CoFe_2O_4$ nanoparticles (NPs) using aloe vera (*A. vera*) leaf extract by the sol-gel auto-combustion method. The synthesized NPs were effective in inhibiting the growth of drug-resistant bacteria, *Candida*, and their preformed biofilms.

FIG. 1A illustrates a flow chart of a method 50 of a method of making and using the bioderived ferromagnetic $CoFe_2O_4$ NPs. The order in which the method 50 is described is not intended to be construed as a limitation, and any number of the described method steps can be combined in any order to implement the method 50. Additionally, individual steps may be removed or skipped from the method 50 without departing from the spirit and scope of the present disclosure.

At step 52, the method 50 includes mixing a cobalt salt and an iron salt in water to form a solution. Suitable examples of cobalt salts include cobalt chloride, chloropentahammine cobalt chloride, hexaammine cobalt chloride, cobalt phosphate, cobalt phosphate, ammonium cobalt sulfate, diammonium tetra nitrate cobalt, cobalt acetate, cobalt formate, cobalt tetraoxide, cobalt bromide, cobalt oxalate, cobalt selenate, cobalt tungstate, cobalt molybdate, cobalt iodide, and cobalt phosphate or its hydrate, or mixtures thereof. In a preferred embodiment, the cobalt salt is cobalt (II) nitrate hexahydrate $Co(NO_3)_2 \cdot 6(H_2O)$.

Suitable examples of iron salts include iron bromide, iron chloride, iron phosphate hydrate, iron phosphate tetrahydrate, iron chloride hydrate, iron chloride tetrahydrate, iron fluoride, ammonium iron sulfate hexahydrate, iron citrate tribasic monohydrate, iron gluconate dehydrate, iron pyrophosphate, iron phthalocyanine, iron phthalocyanine chloride, ammonium iron citrate, ammonium iron sulfate, ammonium iron sulfate, ammonium iron sulfate dodecahydrate, iron chloride, iron bromide, iron chloride hexahydrate, ferric citrate, iron fluoride, iron nitrate nonahydrate, iron oxide, iron phosphate, iron sulfate hydrate, iron gluconate hydrate, iron iodide, iron lactate hydrate, iron oxalate dehydrate, ferrous sulfate heptahydrate, iron sulfide, iron acetate, iron fluoride tetrahydrate, iron iodide tetrahydrate, iron perchlorate hydrate, iron acetylacetonate, iron acetylacetonate, and iron ascorbate or its hydrate, or mixtures thereof. In a preferred embodiment, the iron salt is iron(III) nitrate nonahydrate $Fe(NO_3)_3 \cdot 6(H_2O)_9$.

In some embodiments, the mixture includes a ratio of the cobalt salt to iron salt in a range of 1:1-1:6, preferably 1:2-1:5, and preferably 1:3-1:4. In a preferred embodiment, the mixture includes a ratio of the cobalt salt to iron salt of 1:2. The water may be tap water, distilled water, bi-distilled water, deionized water, deionized distilled water, reverse osmosis water, and/or some other water. In a preferred embodiment, the water is double-distilled water. The mixing may be carried out manually or with the help of a stirrer.

At step 54, the method 50 includes adding an *A. vera* extract to the solution and stirring for 1-10 hours (h), preferably 2-9 h, preferably 3-8 h, preferably 4-7 h, and preferably 5-6 h at a temperature of 30-80 °C, preferably 35-75 °C, preferably 40-70 °C, preferably 45-65 °C, and preferably 50-60 °C to form a gel. In a preferred embodiment, the method includes adding an *A. vera* extract to the solution and stirring for 4 h at a temperature of 50 °C to form the gel. In an embodiment, a color change occurs to form a dark colored gel. In some embodiments, the pH of the solution is adjusted to be 9-11, preferably 10, with any base known in the art such as but not limited to NaOH, or KOH.

Figure 1B:
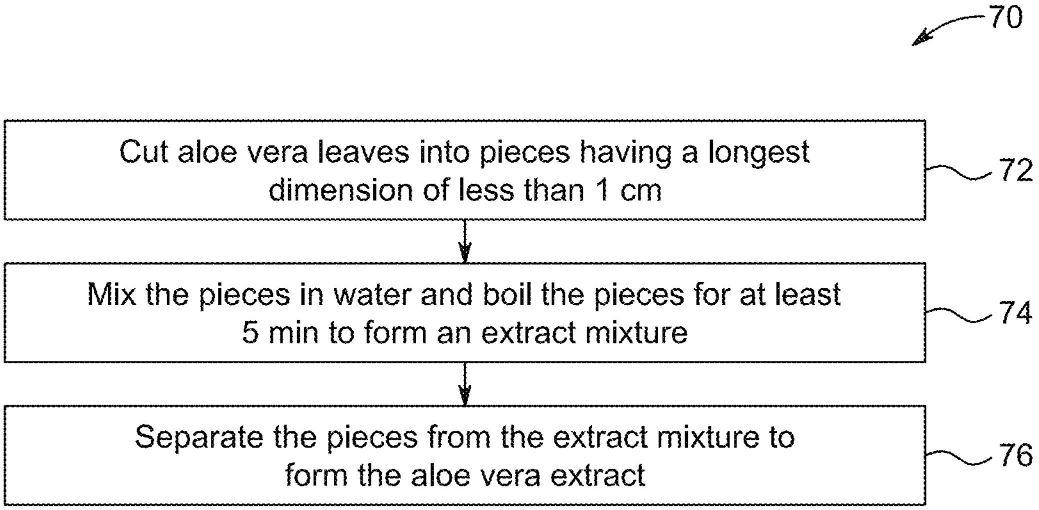
FIG. 1B is a flowchart illustrating a method for making an Aloe vera (*A. vera*) extract, according to certain embodiments.

FIG. 1B illustrates a flow chart of a method 70 of making an *A. vera* extract. The order in which the method 70 is described is not intended to be construed as a limitation, and any number of the described method steps can be combined in any order to implement the method 70. Additionally, individual steps may be removed or skipped from the method 70 without departing from the spirit and scope of the present disclosure.

At step 72, the method 70 includes cutting *A. vera* leaves into pieces having a longest dimension of less than 1 cm, preferably 0.5 cm, and preferably 0.1 cm. *A. vera* (Aloe barbadensis miller) is an important plant in Ayurveda and has been used as medicine for centuries. The leaves of the plant have shown potent anticancer, antioxidant, antidiabetic, and antihyperlipidemic activities. The leaves have also been used against infections caused due to burns or wounds. It contains a variety of phytochemicals, including polysaccharides, phenolic compounds, organic acids, alkaloids, tannins, flavonoids, vitamins, enzymes, carbohydrates, and plant steroids. *A. vera* includes two types of aloin, A and B, which produce picric and oxalic acids of nitric acid and act as biological capping and reducing agents. These compounds promote the development of NPs and alter their surface properties. Furthermore, these metabolites and bioactive compounds can effectively capture the metal ions by serving as capping agents, reducing agents, or stabilizing agents since they are non-toxic and environmentally friendly. In some embodiments, other plant parts of *A. vera*, such as root, stem, flowers, etc., may be used alone or in combination with the *A. vera* leaves as well.

At step 74, the method 70 includes mixing the pieces in water and boiling the pieces for at least 5 minutes (min), preferably 10 min, preferably 15 min, and preferably 20 min, to form an extract mixture. The water may be tap water, distilled water, bi-distilled water, deionized water, deionized distilled water, reverse osmosis water, and/or some other water. In a preferred embodiment, the water is double-distilled water. The mixing may be carried out manually or with the help of a stirrer. In a preferred embodiment, the method 70 includes mixing the pieces in water and boiling the pieces for 15 min at 80 °C At step 76, the method 70 includes separating the pieces from the extract mixture to form the *A. vera* extract. Suitable separation techniques include centrifugation, internal and external filtration, natural and forced sedimentation, magnetic separation, vacuum filtration, vacuum distillation, and chemical conversion. In a preferred embodiment, the separation was done using centrifugation at 10,000 rpm for 20 min, and the filtrate was then again filtered through the Whatman No. 1 filter paper.

At step 56, the method 50 includes heating the gel from step 54 to form a foam. Heating appliances such as hot plates, muffle furnaces, heating mantles ovens, microwaves, autoclaves, and tapes, oil baths, salt baths, sand baths, air baths, hot-tube furnaces, and hot-air guns can be used. In a preferred embodiment, the heating is to a temperature of 30-80 °C, preferably 35-75 °C, preferably 40-70 °C, preferably 45-65 °C, and preferably 50-60 °C. In some embodiments, the foam has a density of 0.1-5 $kg/m^3$, preferably 0.1-5 $kg/m^3$, 0.2-4 $kg/m^3$, 0.5-3 $kg/m^3$, 0.7-2 $kg/m^3$, or about 1 $kg/m^3$. In some embodiments, the foam has a water content of less than 10 wt. % based on a total weight of the foam, preferably less than 8 wt. %, 6 wt. %, 4 wt. %, 2 wt. %, 1 wt. %, or 0.1 wt. %.

At step 58, the method 50 includes calcining the foam at a temperature of 600-1000 °C, preferably 620-980 degrees Celsius (° C.), preferably 640-960 °C, preferably 660-940 °C, preferably 680-920 °C, preferably 700-900 °C, preferably 720-880 °C, preferably 740-860 °C, preferably 760-840 °C, and preferably 780-820 °C for 1-3 h, preferably 1.5-2.5 h, and preferably 1.75-2.25 h to form $CoFe_2O_4$ NPs. The calcination of the foam is carried out by heating it to a high temperature under a restricted supply of ambient oxygen. This is performed to remove impurities or volatile substances and to incur thermal decomposition. Typically, the calcination is carried out in a furnace, preferably equipped with a temperature control system, which may provide a heating rate of up to 50 °C/min, preferably up to 40 °C/min, preferably up to 30 °C/min, preferably up to 20 °C/min, preferably up to 10 °C/min, preferably up to 5 °C/min, preferably up to 2 °C/min, and preferably up to 1 °C/min. In a preferred embodiment, the calcination of the foam is done at a temperature of 800 °C for 2 h. The calcining removes phenolic compounds from the surface of the $CoFe_2O_4$ NPs. In some embodiments, the surface of the $CoFe_2O_4$ NPs has negatively charged hydroxyl groups on the surface. In some embodiments, the $CoFe_2O_4$ NPs have a zeta potential of −15 to −20 millivolts (mV), preferably −16 to −19 mV, and preferably −17 to −18 mV.

In some embodiments, the $CoFe_2O_4$ NPs are crystalline. The $CoFe_2O_4$ NPs have a spinel structure. Spinel oxides having $AB_2O_4$ (A=Mn, Cu, Co, Zn, Fe, Ni; B=Cr, Ni, Mn, Mo, Co) formula have normal, inverse, or complex structures determined by cation occupation of octahedral (Oh) or tetrahedral (Td) sites. In a preferred embodiment, the $CoFe_2O_4$ NPs have an inverse spinel structure.

In some embodiments, the $CoFe_2O_4$ NPs may exist in various morphological shapes, such as nanowires, nanospheres, nanocrystals, nanorectangles, nanotriangles, nanopentagons, nanohexagons, nanoprisms, nanodisks, nanocubes, nanoribbons, nanoblocks, nanobeads, nanotoroids, nanodiscs, nanobarrels, nanogranules, nanowhiskers, nanoflakes, nanofoils, nanopowders, nanoboxes, nanostars, tetrapods, nanobelts, nano-urchins, nanoflowers, etc., and mixtures thereof. In a preferred embodiment, the $CoFe_2O_4$ NPs have a spherical shape.

In some embodiments, the $CoFe_2O_4$ NPs have an average size of 5-35 nm, preferably 6-34, preferably 7-33 nm, preferably 8-32 nm, preferably 9-31 nm, 10-30, preferably 11-29 nm, preferably 12-28 nm, preferably 13-27 nm, preferably 14-26 nm, preferably 15-25 nm, preferably 16-24 nm, preferably 17-23 nm, preferably 18-22 nm, preferably 19-21 nm. In some embodiments, the $CoFe_2O_4$ NPs form aggregates having an average size of 500 nm-1 μm (1000 nm), preferably 600-900 nm, and preferably 700-800 nm.

In some embodiments, the $CoFe_2O_4$ NPs include 15-25 wt. % O, preferably 16-24 wt. %, preferably 17-23 wt. %, preferably 18-22 wt. %, and preferably 19-21 wt. % of O, 40-50 wt. % Fe, preferably 41-49 wt. %, preferably 42-48 wt. %, preferably 43-47 wt. %, and preferably 44-46 wt. % of Fe and 30-40 wt. % Co, preferably 31-39 wt. %, preferably 32-38 wt. %, preferably 33-37 wt. %, and preferably 34-36 wt. % of Co based on the total weight of the $CoFe_2O_4$ NPs. In a preferred embodiment, the $CoFe_2O_4$ NPs include 20.69 wt. % 0, 44.80 wt. % of Fe, and 34.52 wt. % of Co based on the total weight of the $CoFe_2O_4$ NPs.

In some embodiments, the $CoFe_2O_4$ NPs have a saturation magnetization of 40-50 emu/g, preferably 41-49 electromagnetic units per gram (emu/g), preferably 42-48 emu/g, preferably 43-47 emu/g, and preferably 44-46 emu/g at 37 °C. In a preferred embodiment, the $CoFe_2O_4$ NPs have a saturation magnetization of 45.07 emu/g at 37 °C At step 60, the method 50 includes contacting the $CoFe_2O_4$ NPs with a biofilm on a surface. In some embodiments, the biofilm is formed by at least one of Methicillin-resistant *Staphylococcus aureus* (MRSA), *Candida albicans, Pseudomonas aeruginosa, Staphylococcus aureus, Escherichia coli*, multidrug-resistant *Pseudomonas aeruginosa* (MDR-PA), and *Candida parapsilosis*. The biofilms are formed on various surfaces, for example, the surface of a hospital or a healthcare facility, as well as plumbing systems (e.g., sink drain), countertops, building materials, ductwork, and clean rooms. The surface also refers to the interior or exterior of pipes, for example, drains, as well as swimming pools, tanks (e.g., for aquaculture), purification filters, toilet bowls, sinks, and surfaces in the greenhouse.

In some embodiments, the surface is of a medical device, such as prosthetics (hip implants, dental implants, prosthetic joint, a voice prosthetic, a penile prosthetic) a mechanical heart valve, a cardiac pacemaker, an arteriovenous shunt, a schleral buckle, catheters (e.g., central venous catheter, an intravascular catheter, a urinary catheter, a Hickman catheter, a peritoneal dialysis catheter, an endrotracheal catheter), tympanostomy tube, a tracheostomy tube, a surgical suture, a bone anchor, a bone screw, an intraocular lens, a contact lens, an intrauterine device, an aortofemoral graft, or a vascular graft. Other infections from medical devices include those from abdominal drains, biliary tract stents, breast implants, cardiac pacemakers, cerebrospinal fluid shunts, contact lenses, defibrillators, dentures, electrical dialyzers, endotracheal tubes, indwelling urinary catheters, intrauterine devices, intravenous catheters, joint prostheses, mechanical heart valves, nephrostomy tubes, orthopedic implants, peritoneal dialysis catheters, prosthetic heart valves, prosthetic joints allosplastic orthopedic devices, tissue fillers, urethral stents, vascular prostheses, ventilator-associated pneumonia, ventricular assist devices, ventricular derivations, ventricular shunts, and voice prostheses. In some embodiments, the surface is of a surgical device, such as a clamp, forceps, scissor, skin hook, tubing, needle, retractor, scaler, drill, chisel, rasp, or saw.

In some embodiments, the $CoFe_2O_4$ NPs have a concentration of 0.125-1 milligrams per milliliter (mg/mL), preferably 0.150-0.750 mg/mL, preferably 0.175-0.5 mg/mL, and preferably 0.2-0.25 mg per mL of the biofilm while contacting the $CoFe_2O_4$ NPs with the biofilm. The $CoFe_2O_4$ NPs reduce the amount of the biofilm after the contact. In some embodiments, the $CoFe_2O_4$ NPs have a minimum inhibitory concentration (MIC) of 0.25-1 mg/mL, preferably 0.3-0.95 mg/mL, preferably 0.35-0.9 mg/mL, preferably 0.4-0.85 mg/mL, preferably 0.45-0.8 mg/mL, preferably 0.5-0.75 mg/mL, preferably 0.55-0.7 mg/mL, and preferably 0.6-0.65 mg/mL of the biofilm while contacting the $CoFe_2O_4$ NPs with the biofilm. The $CoFe_2O_4$ NPs attach to a cell surface and at least partially penetrate and distort a cell membrane in the biofilm, leading to cell death. In some embodiments, the $CoFe_2O_4$ NPs inhibit and penetrate the cell walls of gram-negative bacteria more effectively than gram-positive bacteria.

In some embodiments, the $CoFe_2O_4$ NPs have a concentration of 0.5 mg/mL of the biofilm while contacting the $CoFe_2O_4$ NPs with the biofilm. The $CoFe_2O_4$ NPs reduce the amount of a *Candida albicans* biofilm by at least 40%, preferably 45%, preferably 50%, preferably 55%, preferably 60%, preferably 65%, preferably 70%, 24 h after contacting the $CoFe_2O_4$ NPs with the *Candida albicans* biofilm. The $CoFe_2O_4$ NPs reduce the amount of a *Pseudomonas aeruginosa* biofilm by at least 40%, preferably 45%, preferably 50%, preferably 55%, preferably 60%, preferably 65%, preferably 70%, 24 h after contacting the $CoFe_2O_4$ NPs with the *Pseudomonas aeruginosa* biofilm. The $CoFe_2O_4$ NPs reduce the amount of an MRSA biofilm by at least 40%, preferably 45%, preferably 50%, preferably 55%, preferably 60%, preferably 65%, preferably 70%, 24 h after contacting the $CoFe_2O_4$ NPs with the MRSA biofilm.

In an embodiment, the method 50 further includes functionalizing the surface of the $CoFe_2O_4$ NPs with an antibacterial compound prior to contacting the $CoFe_2O_4$ NPs with the biofilm. The functionalization allows the penetration of the antibacterial agents into the polysaccharide matrix of the bacterial cells. The antibacterial is bound to the surface of the $CoFe_2O_4$ NPs. The nature of bonding between the antibacterial compound and the $CoFe_2O_4$ NPs may be covalent or non-covalent; however, in preferred embodiments, the antibacterial compound is covalently bound to the $CoFe_2O_4$ NPs. In some embodiments, the antibacterial compound is covalently bound through the hydroxyl groups on the surface of the NPs, thereby creating a bond as follows, NP-O-Antibacterial. In a preferred embodiment, the antibacterial compound is selected from the group consisting of amoxicillin, doxycycline, cephalexin, ciprofloxacin, clindamycin, metronidazole, azithromycin, sulfamethoxazole, trimethoprim, clavulanate, levofloxacin.

In yet another embodiment, the method 50 further includes functionalizing a surface of the $CoFe_2O_4$ NPs with a photosensitizer prior to contacting the $CoFe_2O_4$ NPs with the biofilm. Photosensitizers are light absorbers that change the course of a photochemical reaction. Photosensitizers utilize light to enact a chemical change in another species, after the chemical change, the photosensitizer returns to its initial state, remaining chemically unchanged from the process. For example, upon absorption of light a photosensitizer can induce the formation of reactive oxygen species (ROS) from ambient oxygen. ROS include, but are not limited to, superoxide anion radical, hydroxyl radical, hydroperoxyl radical, and singlet oxygen. The production of various types of ROS causes the penetration of NPs inside the cell that may interfere with cell wall synthesis; penetration of NPs causes the rupturing of the cytoplasmic membrane that leads to the leakage of genetic materials, proteins, and minerals that cause the death of bacteria. In some embodiments, the photosensitizer is covalently bound to the surface of the $CoFe_2O_4$ NPs. In some embodiments, the photosensitizer is covalently bound through the hydroxyl groups on the surface of the NPs, thereby creating a bond as follows, NP-O-Photosensitizer. In some embodiments, the photosensitizer is selected from the group consisting of methylene blue, toluidine blue, curcumin, hypericin, phthalocyanines, and porphyrins. In some embodiments, the method includes irradiating the $CoFe_2O_4$ NPs with the photosensitizer after contacting with the biofilm to form reactive oxygen species. The irradiating is with any light source having a wavelength of 300-800 nm, preferably 350-750 nm, 400-700 nm, 450-650 nm, or 500-550 nm.

EXAMPLES

The following examples demonstrate a method of fabrication of $CoFe_2O_4$ nanoparticles (NPs) using Aloe vera leaf extract and using the NPs to reduce biofilm growth. The examples are provided solely for illustration and are not to be construed as limitations of the present disclosure, as many variations thereof are possible without departing from the spirit and scope of the present disclosure.

Example 1: Materials

Cobalt(II) nitrate hexahydrate $Co(NO_3)_2 \cdot 6(H_2O)$ and iron (III) nitrate nonahydrate $Fe(NO_3)_3 \cdot 6(H_2O)_9$ were purchased from Sigma Aldrich, USA, as starting materials. Aloe vera was obtained from a local garden. Brain heart infusion (BHI), RPMI 1640, Mueller Hinton agar, Sabouraud dextrose agar, glutaraldehyde, osmium tetroxide, paraformaldehyde, trypticase soy broth (TSB), glucose, ethanol, 3-(4,5-dimethylthiazol-2-yl)-2,5-diphenyltetrazolium bromide (MTT) assay kit, Dulbecco's modified Eagle medium (DMEM) penicillin-streptomycin (1%), L-glutamine, fetal bovine serum (FBS), 4',6-diamidino-2-phenylindole (DAPI), phosphate-buffered saline (PBS), and Triton X-100 were purchased from Molequle-ON, New Zealand. All reagents were used without further purification.

Example 2: Preparation of the Aloe Vera Leaf Extract

*Aloe vera* (*A. vera*) plants were chosen for the biosynthesis of $CoFe_2O_4$ NPs due to their accessibility, affordability, and medicinal benefits. Fresh *A. vera* leaves were cleaned in double-distilled water to eliminate dust. The leaves were then cut into small pieces and dried in the air. In 500 milliliters (mL) beakers with 200 mL of distilled water, 20 g of finely chopped leaves were added and boiled for 15 minutes (min) at 80 degrees Celsius (° C.). After cooling to 37 °C, these leaves were centrifuged at 10,000 revolutions per minute (rpm) for 20 minutes at 4 °C, and the supernatant fluid was then filtered through Whatman No. I filter paper. The collected supernatant (solution A) was kept at 4 °C to 8 °C and used as a capping agent in the biosynthetic pathways of $CoFe_2O_4$ NPs.

Example 3: $CoFe_2O_4$ NP Synthesis

A green sol-gel process, followed by auto-combustion, was used to synthesize $CoFe_2O_4$ nanopowder. Cobalt nitrate and iron nitrate in 1:2 ratios were mixed in 50 mL of double-distilled water and centrifuged to get a clear solution (solution B). 50 mL aqueous *A. vera* extract of solution A was transferred to solution B to obtain a mixture. The mixture was vigorously stirred at 50 °C for 4 hours (h), the resulting sol began to transform into a brown, viscous gel, signifying the completion of the reduction process. The pH was adjusted to 10 using a sodium hydroxide (NaOH) solution. A dark precipitate started to form after being cooled to 37 °C overnight, indicating the beginning of the formation of NPs. The NPs were separated using centrifugation for 15 min at 4 °C and an rpm of 12,000. Further, to remove any remaining biological molecules, they were washed with deionized water five times, followed by a single washing with 100% ethanol. A fine powder was formed after the purified NPs were dried in a hot air oven at 60 °C. The gels initially melted and then spontaneously self-ignited, releasing magnetic foams as a byproduct. The magnetic foams were then calcined at 800 °C for 2 h to increase crystallization. Additionally, the particles were treated with ultrasound to disperse the individual particles.

Example 4: Characterization Techniques

X-ray diffraction (XRD) analysis was used to characterize the phase composition, crystalline structure, and diameter of the NPs using CuKα radiation (λ=1.54056) in the range of 20°≤2θ≤80° at 40 kilo electron volts (keV) using an X-ray powder diffractometer (Shimadzu XRD-7,000). A Fourier transform infrared (FTIR) spectrometer (Shimadzu IRSpirit, Shimadzu, Japan) was used to determine the functional group present in *A. vera* extract and synthesize NPs in the range of 4000 $cm^{-1}$ to 500 $cm^{-1}$. Scanning electron microscopy (SEM) (TESCAN VEGA3) and transmission electron microscopy (TEM) (Morgagni 268) were used to further analyze the size and shape of the synthesized NPs. Furthermore, the elemental composition of bio-inspired NPs was carried out using energy dispersive X-ray (EDX) (TESCAN VEGA3). The hydrodynamic diameter and surface charge (zeta potential) were measured using a DLS and Nano-ZS Zetasizer (Malvern Instruments, UK). The electron binding energies for the elements were measured by X-ray photoelectron spectroscopy (XPS) on an ESCALAB 250Xi X-ray photoelectron spectrometer. VSM (7410; USA) was used to create a magnetic field characteristic at 37 °C with a maximum external magnetic field of 10,000 Oe.

Example 5: Strains

MRSA ATCC 33591, MDR-PA (clinical isolate), *C. albicans* ATCC 14053, *C. parapsilosis* (ATCC 22019), *E. coli* ATCC 25922, *P. aeruginosa* ATCC 27853, and *S. aureus* ATCC 25923 were used for antimicrobial testing of the synthesized $CoFe_2O_4$ NPs.

Example 6: Antimicrobial Activity by Determining Minimal Inhibitory Concentration (MIC)

The MIC of $CoFe_2O_4$ NPs was calculated using the MIC microbroth dilution method. The bacteria and *Candida* cultures were incubated at 37 °C for 24 h after being exposed to twofold serial dilutions of $CoFe_2O_4$ of 10 mg/mL and 0.156 mg/mL. For testing the MIC of bacterial strains, BHI broth was used, whereas for *C. albicans*, RPMI 1,640 culture medium was used according to the guidelines of the Clinical and Laboratory Standards Institute (M27-S4). The initial concentration of $CoFe_2O_4$ NPs at which no perceivable growth was noted is known as the MIC value.

Example 7: Effect of $CoFe_2O_4$ NPs on Biofilm-Forming Capabilities of Bacteria and *Candida*

The biofilm prevention of bacteria and *Candida* after treatment with $CoFe_2O_4$ NPs was examined by crystal violet bioassay. The freshly harvested cultures were inoculated in a 96-well plate containing TSB+2% glucose in the case of bacteria and RPMI+2% glucose in the case of *Candida*, and then, each plate was incubated for 24 h at 37 °C and 28 °C, respectively, after being exposed to various $CoFe_2O_4$ NP concentrations. The $CoFe_2O_4$ NP-free bacteria and *Candida* were used as controls. All of the contents were removed from the wells after the incubation time and delicately washed three times with PBS, and further, the microtiter plate was left for air drying. Crystal violet (0.1% w/v) was used to stain the adhered biofilms for 30 min, and then, the dyes were decanted, cleaned with PBS, and allowed to dry. The stained biofilm was hydrolyzed with 95% ethanol after the wells were dried, and the absorption spectrum was recorded at 595 nanometers (nm).

Example 8: Removal of the Prevailing Biofilms by $CoFe_2O_4$ NPs

Additionally, the impact of $CoFe_2O_4$ NPs on preformed bacterial and *Candida* biofilms, inoculated in TSB+2% glucose and RPMI+2% glucose, respectively, was investigated. In this assay, the test cultures were incubated for 24 h without any intervention, resulting in the formation of biofilms in 96-well polystyrene plates. To remove the weakly adhered and planktonic bacteria, a gentle rinsing with PBS was applied to the wells. Furthermore, fresh RPMI was once again poured into the wells, and $CoFe_2O_4$ NPs were then added to achieve the required concentrations. Another 24 hours of static incubation was done on the microtiter plate. As aforementioned, biofilms were stained, and the wells of polystyrene plates were washed. Using a microplate reader, the optical density (OD) of the wells was measured at 595 nm. The data is displayed as the percentage of biofilms that are still observable in treatment groups when compared to untreated control groups.

Example 9: SEM and Light Microscopic Visualization of Biofilm Architecture

The impact of $CoFe_2O_4$ NPs on the architecture of the tested biofilm strains was further examined by SEM. In a 12-well culture plate, 100 microliters (μl) of fresh cultures of bacteria and *Candida* cells were grown on the coverslip for 24 h at 37 °C and 28 °C, respectively. The coverslips were removed after the incubation, washed with PBS to get rid of the un-adherent cells, and then fixed with glutaraldehyde (2.5% v/v). Moreover, the coverslips were rinsed again in PBS and dehydrated with a series of ethanol concentrations, including 20%, 30%, 40%, 50%, 60%, 70%, 80%, and 90%, one time for each, and twice in 100% for 10 min each, and then air-dried. Finally, SEM images of *Candida* and bacterial biofilm structures were taken at 20 kilovolts (kV).

Example 10: SEM Morphology of Bacteria and *Candida* Cells Treated with $CoFe_2O_4$ NPs SEM was used to analyze the topological changes in bacteria and *Candida* after treatment with 0.25 mg/mL of $CoFe_2O_4$ NPs. After treatment and incubation, the samples were centrifuged for 15 min, and the recovered pellets were then washed four times with PBS. Then, the samples were fixed with 2.5% glutaraldehyde and 1% osmium tetroxide, followed by dehydration with a series of ethanol concentrations including 20%, 30%, 40%, 50%, 60%, 70%, 80%, and 90%, one time for each and twice at 100% for 10 min each. In addition, the samples were put on the aluminum stubs, followed by a gold coating. Finally, the effects of $CoFe_2O_4$ NPs on bacteria and *Candida* structure were studied using an SEM at 20 kV.

Example 11: MTT Assay

Two cancer cell lines, including human colon adenocarcinoma HCT116 (ATCC® CCL-247) and cervical cancer HeLa (ATCC®CRM-CCL-2), and one normal non-cancerous cell line, including human embryonic kidney HEK-293 (ATCC CRL-1573), were used to determine the cytotoxic effect of $CoFe_2O_4$ NPs. The cells were maintained at 37 °C in DMEM supplemented with penicillin-streptomycin (1%), L-glutamine (1%), and FBS (10%) in a $CO_2$ (5%) humid chamber. The cells were then exposed to 2.0 μg to 20 μg/mL of $CoFe_2O_4$ NPs for 48 h and processed for the cell viability assay. In the untreated control, $CoFe_2O_4$ NPs were not added. After 4 h of incubation with MTT (5.0 mg/mL), the OD was measured at 570 nm, and the cell viability was computed as follows:

$$\text{Cell viability (\%)} = OD \text{ of sample}/OD \text{ of control} \times 100.$$

Example 12: Apoptotic Assay by DAPI Staining

To examine the effects of NPs on cancer cell DNA, a modified DAPI (1 μg/mL) staining test was used. Two groups of cells were produced: the control group, which received no $CoFe_2O_4$ NPs, and the experimental group, which received 20 μg/mL of $CoFe_2O_4$ NPs. All these groups underwent ice-cold paraformaldehyde (4%) exposure after the 48-hour treatment period, followed by Triton X-100 in PBS. A fluorescent confocal scanning microscope was used to investigate DAPI-stained cells.

Example 13: Statistical Analysis

The statistical analyses were performed using version 16 of SPSS, IBM. Using t-tests, comparisons were made between the control group and the treatment group. A value of $p<0.05$ was used to determine a statistically significant variation.

Example 14: Synthesis of $CoFe_2O_4$ NPs

The following illustrates how *A. vera* leaf extract contributes to the synthesis of $CoFe_2O_4$ NPs. The polyphenolic compounds (PCs) present in the extract combine with $Fe^{3+}$ and $Co^{2+}$ ions to form brownish-green PCs-Fe-Co complex. Finally, $CoFe_2O_4$ NPs (brown-black) were obtained after the complex was decomposed via heat treatment. $Co(NO_3)_2 \cdot 6H_2O + Fe(NO_3)_3 \cdot 9H_2O$+Aloe vera extract (PCs)=PCs-$CoFe_2O_4 + 6NO_2 + 15H_2O$ PCs-$CoFe_2O_4$+calcination (800 °C/2 h): $CoFe_2O_4$ nano powder.

Example 15: XRD Analysis

Figure 1C:
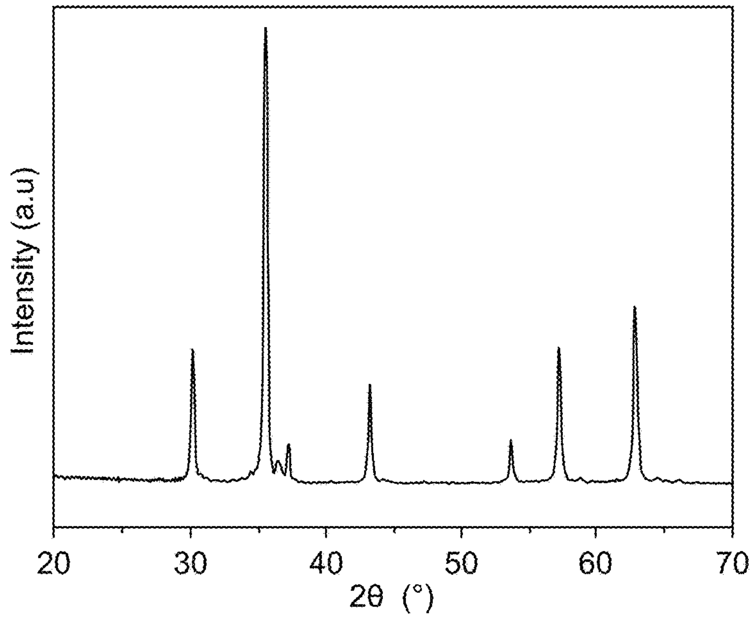
FIG. 1C depicts X-ray diffraction (XRD) pattern of $CoFe_2O_4$ nanoparticles (NPs) synthesized via a green synthesis route, according to certain embodiments.

The calcined powder spinel $CoFe_2O_4$ NPs XRD pattern is shown in FIG. 1C. The peak positions at 31.24°, 36.74°, 37.38°, 44.81°, 54.28°, 58.16°, and 63.58° correspond to hu values of (220), (311), (222), (400), (422), (511), and (440), respectively. The aforementioned values match with ICDD card no: 22-1086 of $CoFe_2O_4$ and belong to the Fd3m space group with an inverse spinel crystal structure. The synthesized substance was found to be pure $CoFe_2O_4$ NP since no other phases or impurities were present. The lattice parameter was discovered to be a=8.3572 Angstrom (Å). The structural parameters were determined by the Rietveld refinement for XRD patterns through a program by the Scherrer formula using the most intense (311) peak, and the average crystalline size was 33.5 nm, as documented in Table 1.

TABLE 1

Structural parameters of $CoFe_2O_4$ NPs synthesized via the green synthesis route

| | α (Å) | V (Å)$^3$ | $D_{XRD}$ (±0.05 nm) | $\chi^2$ (chi$^2$) | $R_{Bragg}$ |
|---|---|---|---|---|---|
| $CoFe_2O_4$ | 8.3572 | 583.8452 | 33.5 | 5.3 | 35 |

Example 16: FTIR Spectroscopy

Figure 2:
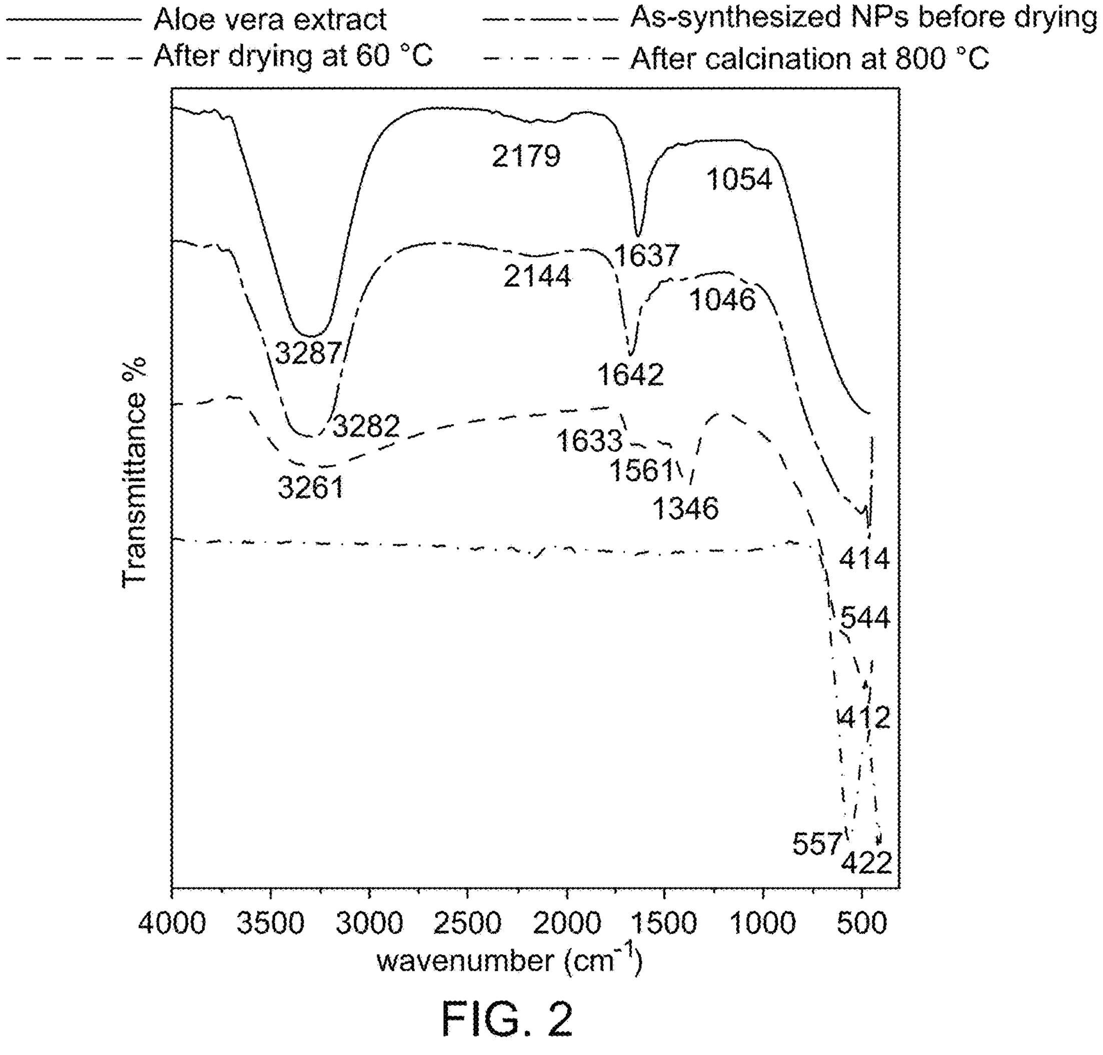
FIG. 2 shows Fourier transform infrared (FTIR) absorption spectra of $CoFe_2O_4$ NPs for the *A. vera* extract, as-synthesized NPs before drying, spectra after drying at 60 °C, and spectra after calcination at 800 °C, according to certain embodiments.

The FTIR spectra of *A. vera* extract, the as-prepared NPs, NPs after drying at 60 °C, and NPs after calcination at 800 °C are shown in FIG. 2. The presence of the Fe—O bond at about 557 $cm^{-1}$ confirmed the formation of iron oxide NPs in the biosynthesized $CoFe_2O_4$. The peak at 557 $cm^{-1}$ confirms Fe ions present in the tetrahedral sites, whereas the peak at 412 $cm^{-1}$ to 422 $cm^{-1}$ is characteristic of the vibration of the metal-oxygen absorption band. The aforementioned two prominent bands prove that the synthesized NPs have the characteristic of spinel structures. The formation of $CoFe_2O_4$ NPs is also supported by the XRD analysis. As can be seen from FIG. 2, the peaks in the area of 1,637 $cm^{-1}$, 1,642 $cm^{-1}$, and 1,633 $cm^{-1}$ show the presence of deformation of the vibrations of phenolic hydroxyl group (—OH) and vibrations of C—O and CO bonds in COO groups of flavonoids in plant extract, confirming the capping activity of polyphenols on the surface of the NPs. Furthermore, the shifting of bands from 1,637 $cm^{-1}$ to 1,642 $cm^{-1}$ and from 1,054 $cm^{-1}$ to 1,046 $cm^{-1}$ after capping show that the extract was effective in acting as both a stabilizing and a capping agent during the green synthesis of the $CoFe_2O_4$ NPs. The broad peak at around 3200 $cm^{-1}$ indicates more surface hydroxyl groups due to —OH stretching on the surface of molecules.

Example 17: SEM and EDX Analysis

Figure 3A:
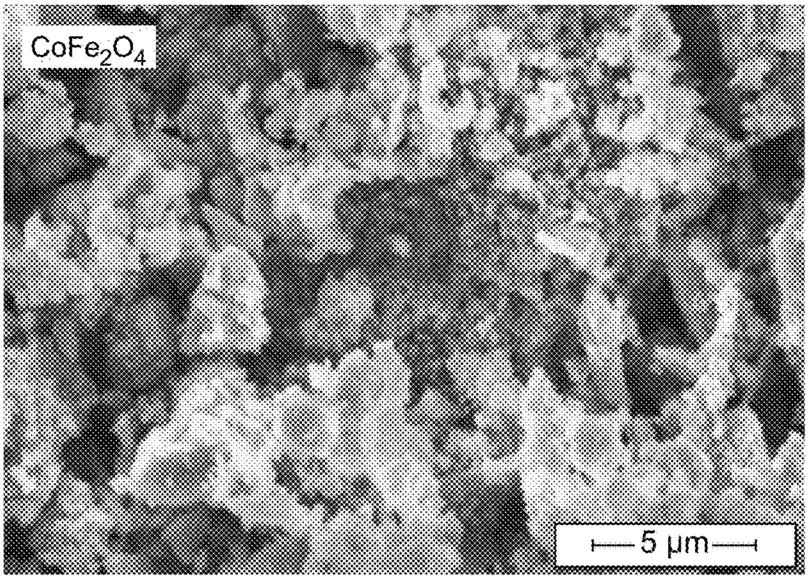
FIG. 3A is a scanning electron microscopy (SEM) image of $CoFe_2O_4$ NPs synthesized via the green synthesis route, according to certain embodiments.
Figure 3B:
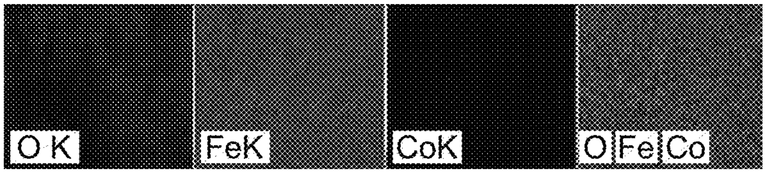
FIG. 3B shows energy dispersive X-ray (EDX) results for $CoFe_2O_4$ NPs synthesized via the green synthesis route, according to certain embodiments.
Figure 3C:
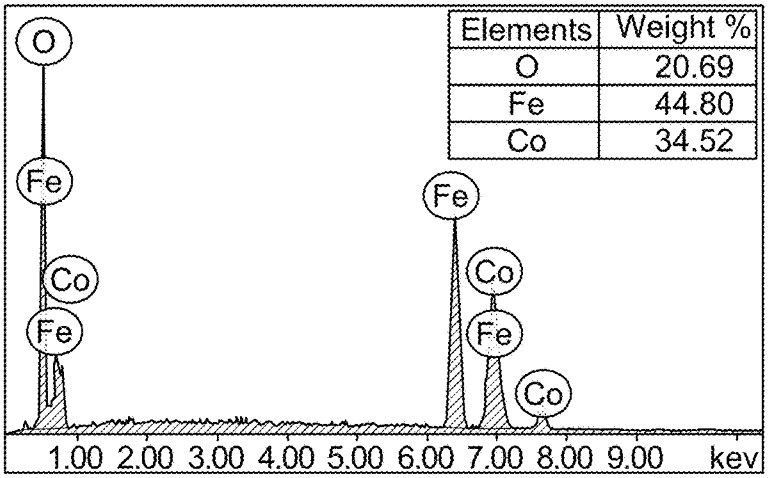
FIG. 3C shows elemental mapping results of $CoFe_2O_4$ NPs synthesized via the green synthesis route, according to certain embodiments.

The magnetic $CoFe_2O_4$ NP microstructures were described using SEM. FIG. 3A depicts the SEM image of $CoFe_2O_4$. The SEM image showed a highly agglomerated, nano-grained structure with irregular shapes due to its magnetic nature. The NPs were evenly distributed throughout the sample and were nearly spherical in size. According to the findings of SEM analysis, $CoFe_2O_4$ particles have a non-uniform and heterogeneous morphology because of the agglomeration of magnetic force. The EDX spectra and elemental mapping of $CoFe_2O_4$ are depicted in FIG. 3B and FIG. 3C along with the elements Co, Fe, and O. The elemental composition of $CoFe_2O_4$ NPs shows Fe as the major element with 44.80% weight, Co as the second main element with 34.52% weight, and oxygen as the final main element with 20.69% weight. These results confirmed the formation of the desired $CoFe_2O_4$ NP compositions. No additional elements have been observed, indicating the high purity of the synthesized sample, and the elements were successfully incorporated into the $CoFe_2O_4$ samples.

Example 18: TEM, Zeta Potential, and DLS Analysis

Figure 4A:
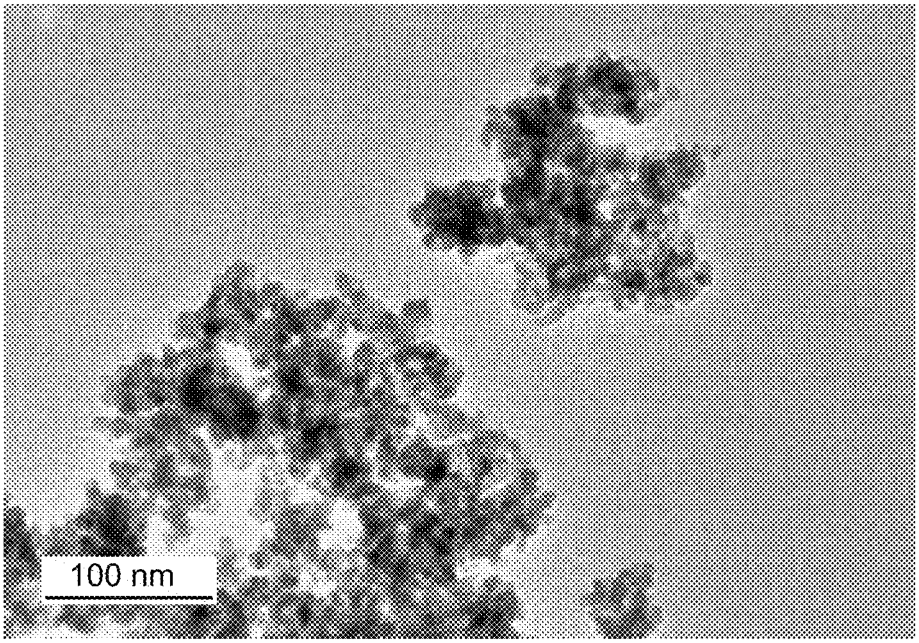
FIG. 4A shows a transmission electron microscopy (TEM) image of $CoFe_2O_4$ NPs at 100 nanometers (nm) magnification, according to certain embodiments.
Figure 4B:
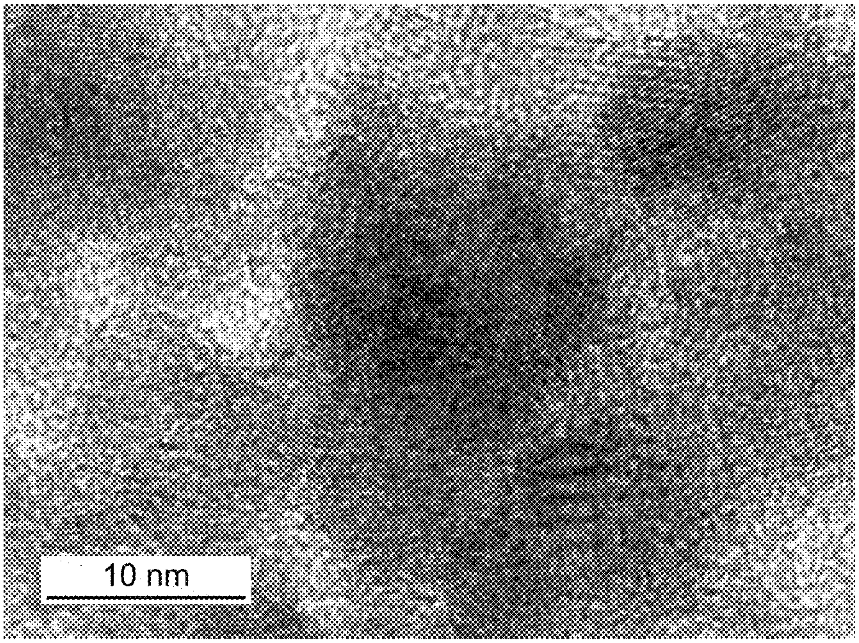
FIG. 4B shows a TEM image of $CoFe_2O_4$ NPs at 10 nm magnification, according to certain embodiments.
Figure 4C:
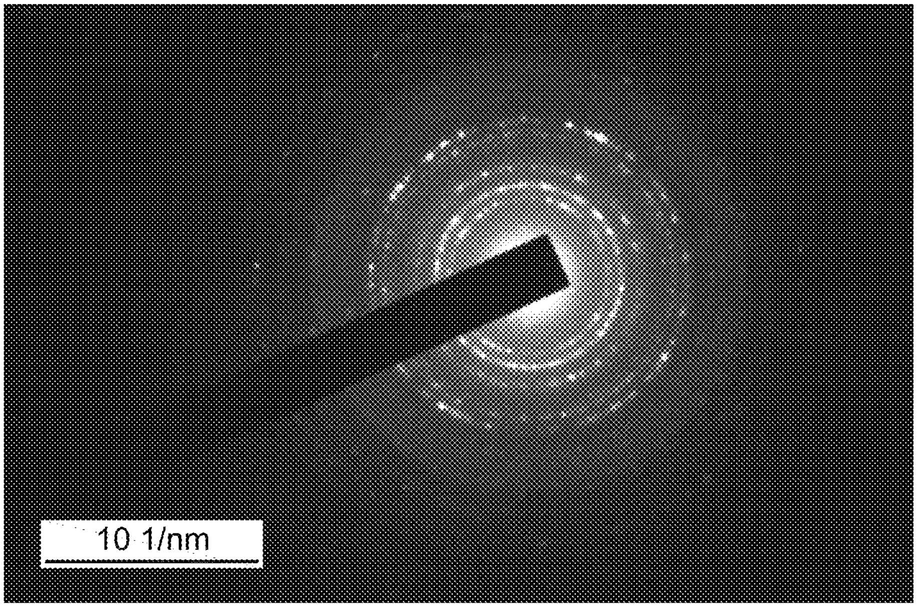
FIG. 4C shows selected area electron diffraction (SAED) pattern of $CoFe_2O_4$ NPs, according to certain embodiments.

TEM examination was used to further explore the morphology and structure of $CoFe_2O_4$ nanostructures. The TEM images and selected area electron diffraction (SAED) pattern of $CoFe_2O_4$ NPs are shown in FIG. 4A-FIG. 4C, respectively. The image depicts NPs with a good degree of crystalline structure, a narrow size distribution, a spherical form, and an average particle size of 8.68 nm. The corresponding SAED patterns of $CoFe_2O_4$ nanostructures, as shown in FIG. 4C exhibits spotty ring patterns, indicative of the typical nanocrystalline nature of the spinel ferrite structure, with no additional diffraction spots. The SAED pattern exhibits seven discernible diffraction rings, the coordinates of which correspond well to standard $CoFe_2O_4$ powder XRD analysis.

Figure 5A:
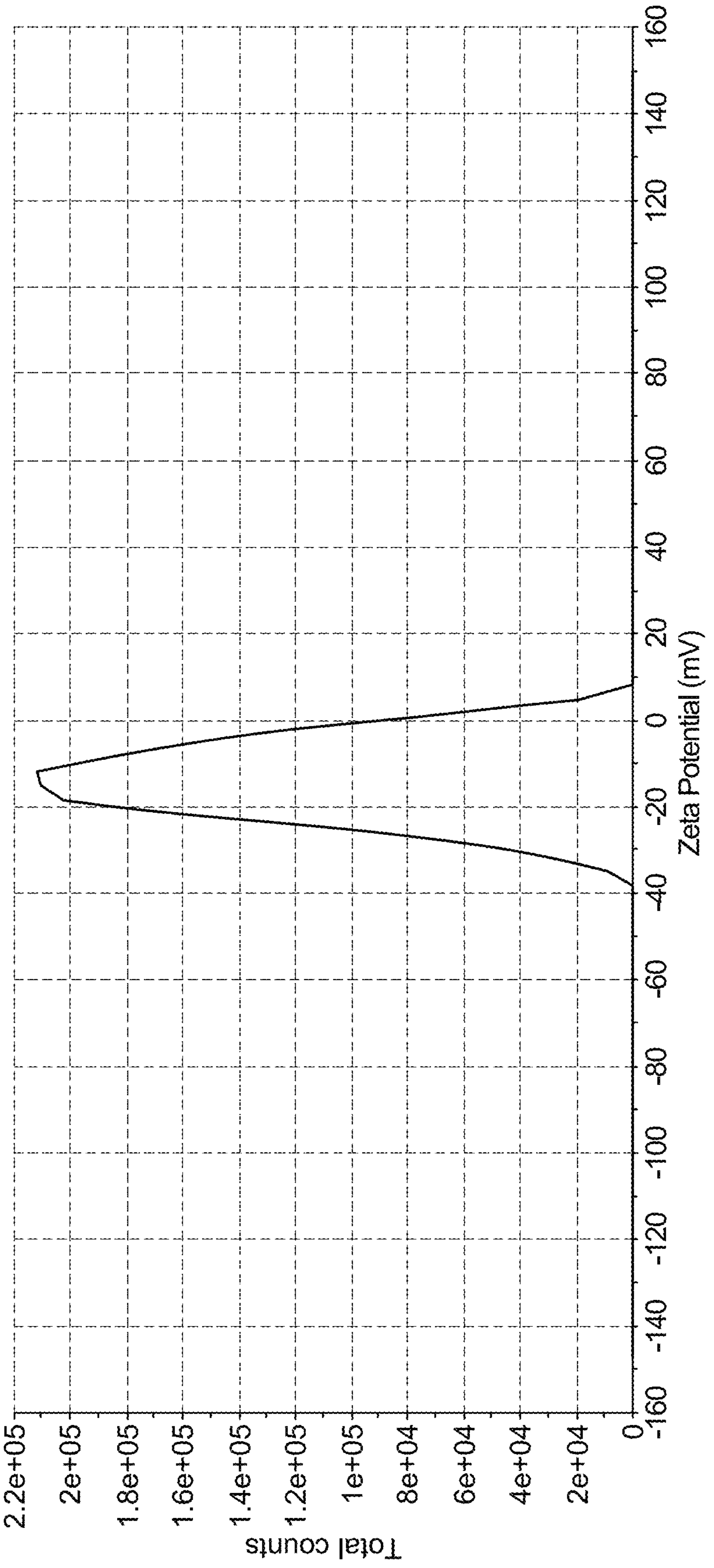
FIG. 5A shows zeta potential analysis of $CoFe_2O_4$ NPs, according to certain embodiments.
Figure 5B:
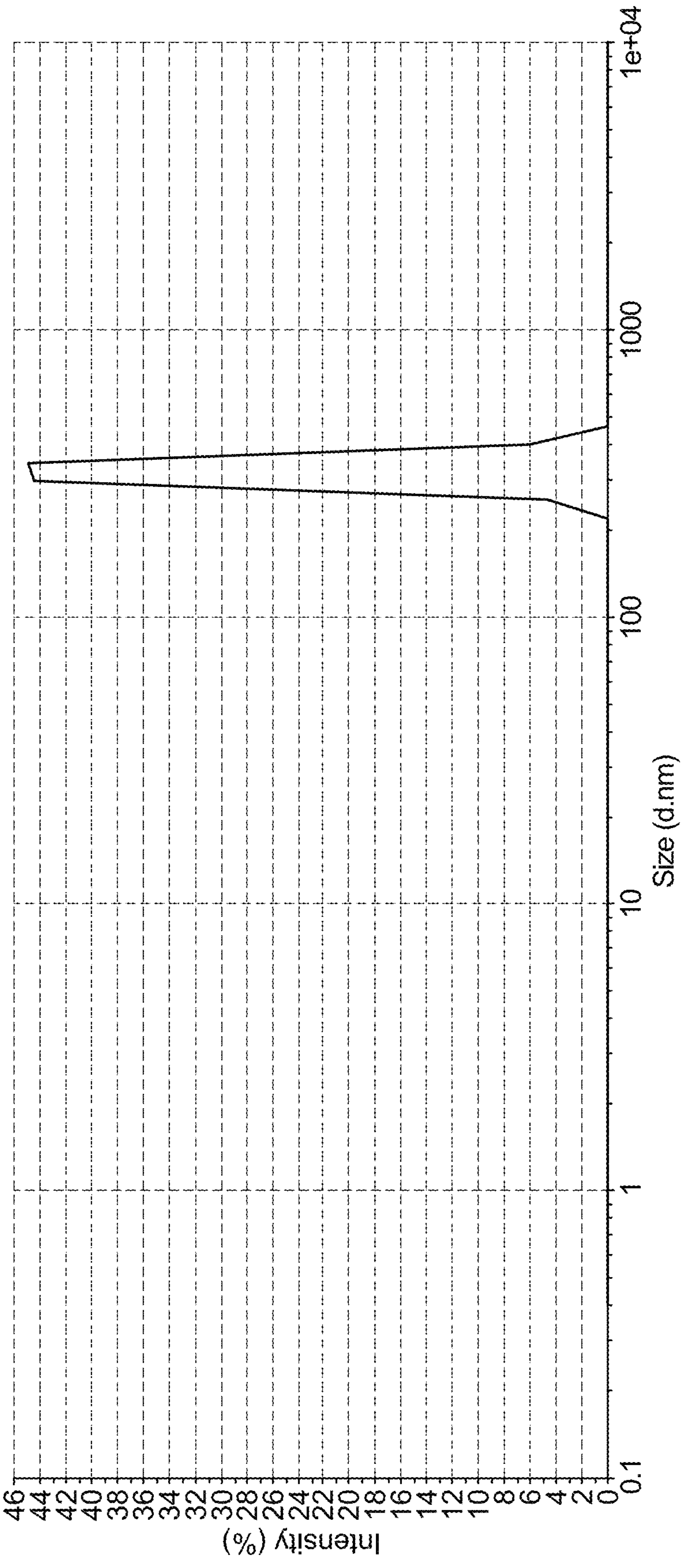
FIG. 5B shows dynamic light scattering (DLS) analysis of $CoFe_2O_4$ NPs, according to certain embodiments.

Further, FIG. 5A depicts the zeta potential and mean hydrodynamic diameter. Zeta potential measurements reveal a surface charge of −13.3 mV, suggesting that $CoFe_2O_4$ NP has a quantity of negative charges on its surface, which helps to keep NP stable. FIG. 5B shows the DLS studies depicting that the average size of the green synthesized $CoFe_2O_4$ NPs was 621.1±146.8 nm. When compared to DLS experiments, the average particle sizes found in TEM and XRD are different. This is a result of the solvation attributes observed during DLS studies. Here, DLS only permits monitoring the material in its solvated condition, where the NPs may be bound to a solvent molecule. However, in the case of TEM and XRD analyses, the sample is seen in a compact, dry state.

Example 19: XPS Analysis

Figure 6A:
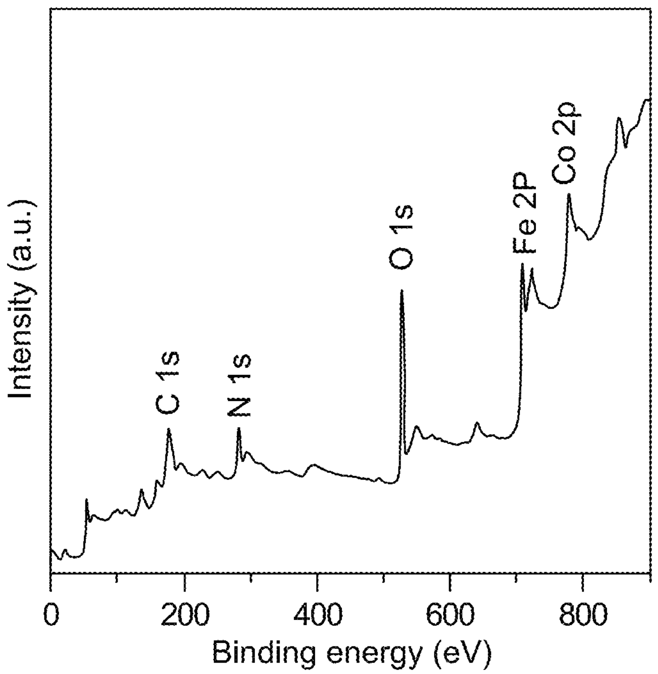
FIG. 6A shows an X-ray photoelectron spectroscopy (XPS) survey scan of $CoFe_2O_4$ NPs, according to certain embodiments.
Figure 6B:
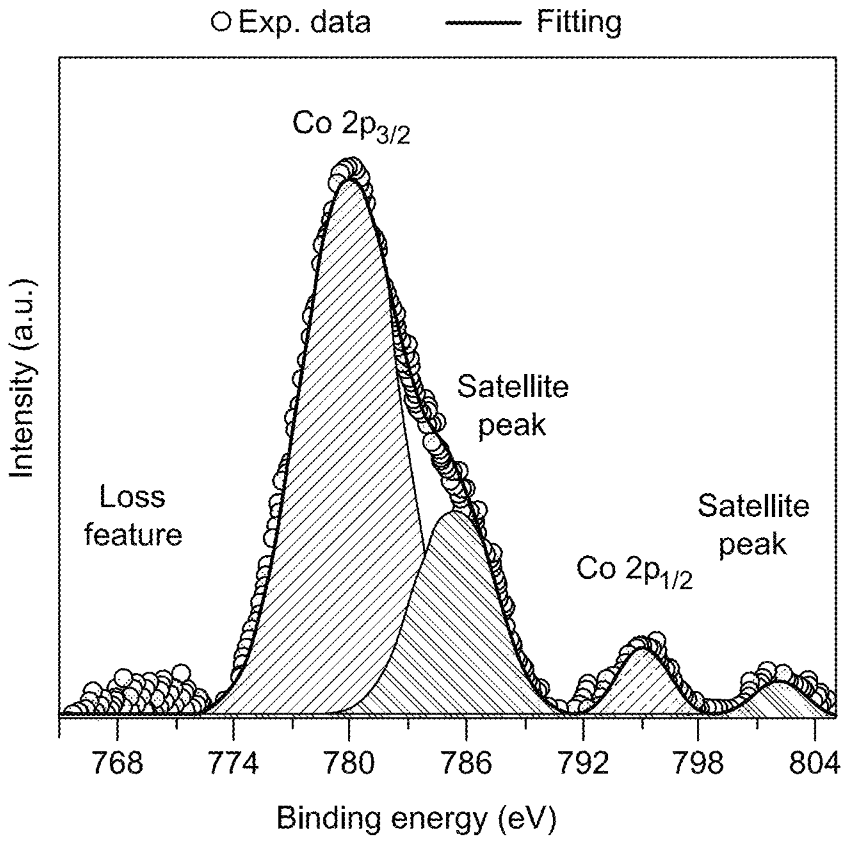
FIG. 6B shows a core level spectrum of Co 2p for the $CoFe_2O_4$ NPs, according to certain embodiments.
Figure 6C:
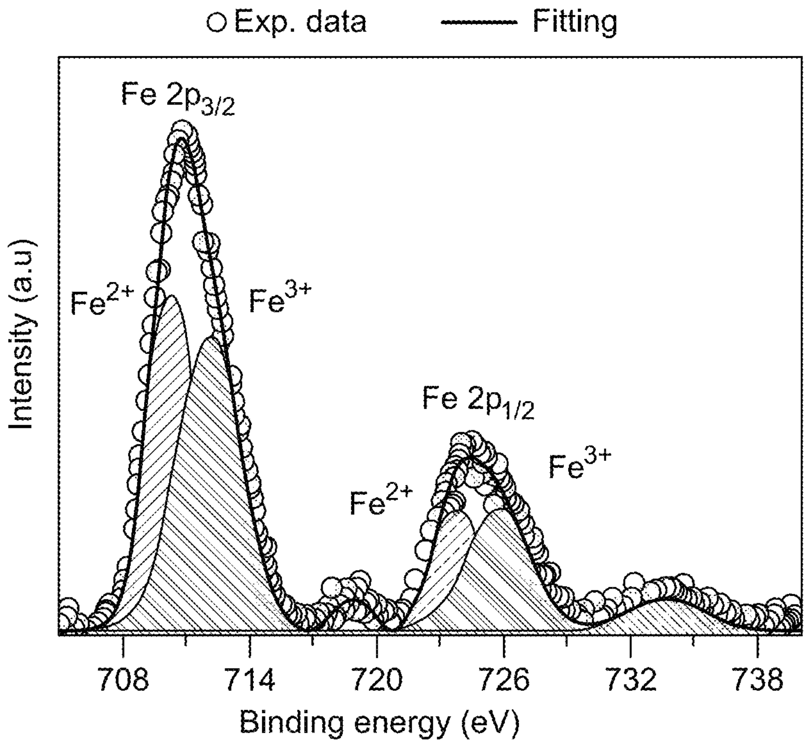
FIG. 6C shows a core level spectrum of Fe 2p for the $CoFe_2O_4$ NPs, according to certain embodiments.
Figure 6D:
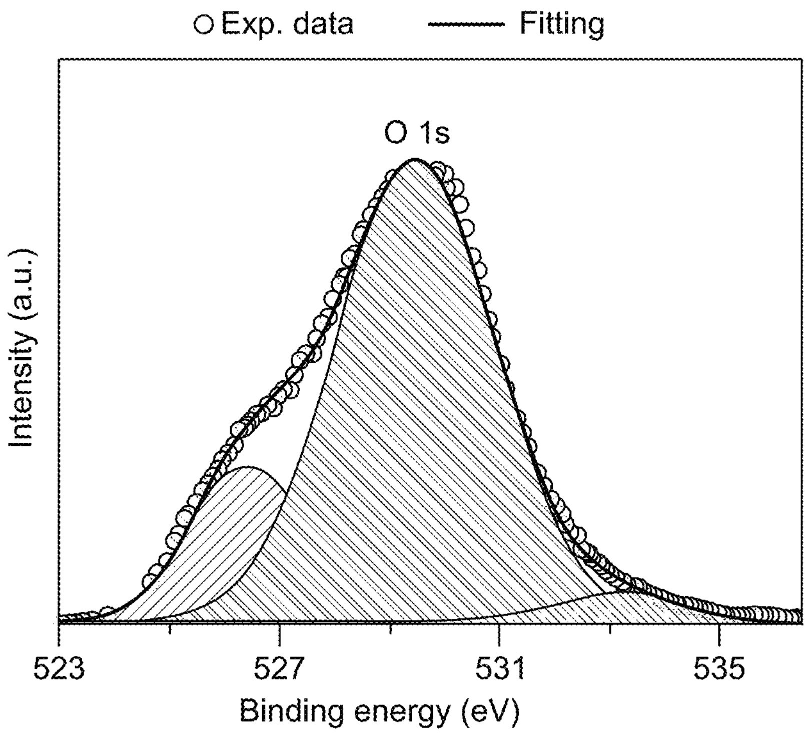
FIG. 6D shows a core level spectrum of O Is for the $CoFe_2O_4$ NPs, according to certain embodiments.

An XPS analysis of $CoFe_2O_4$ NPs was performed to ascertain the existence of each element and the related energy states. On the basis of the survey scan conducted over a broad energy range, as depicted in FIG. 6A, each component of the sample was efficiently determined. The identified elements have been further deconvoluted and matched by fixing an inadvertent C—C bond energy to 284.8 eV. As illustrated in FIG. 6B, the core spectra for Co $2p_{3/2}$ and Co $2p_{1/2}$ were found at 780.4 eV and 795.5 eV, respectively, coupled with two satellite peaks at 786 eV and 804 eV. FIG. 6C illustrates the core-level spectra of Fe $2p_{3/2}$ at 710.2 eV and Fe $2p_{1/2}$ at 723.5 eV. Furthermore, deconvolution of the Fe spectra did not reveal any peaks confirming the existence of $Fe^{3+}$ ions at sites other than octahedral sites in the ferrite structure. Furthermore, FIG. 6D depicts a broad peak of the O 1s spectrum that has been deconvoluted into three distinct peaks at 526.8 eV, 530.4 eV, and 534.1 eV.

Example 20: Magnetic Properties

Figure 7:
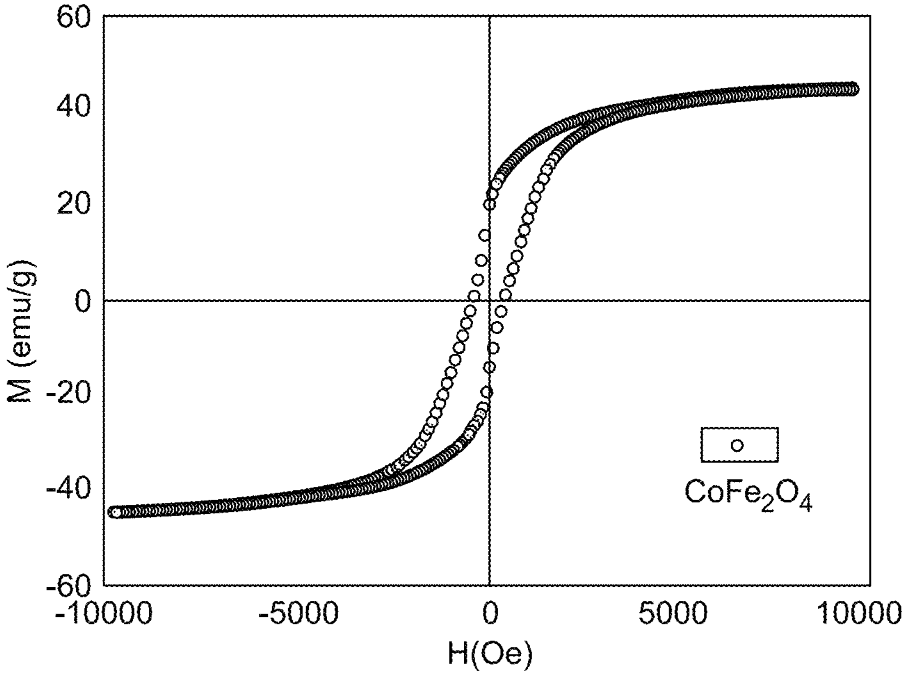
FIG. 7 shows M-H hysteresis loop of $CoFe_2O_4$ NPs synthesized via the green synthesis route, according to certain embodiments.

VSM was used to reveal the M-H behavior of $CoFe_2O_4$ NPs synthesized via the green synthesis route. The dependence of applied magnetic field of magnetization M (H) measurements was accomplished at 37 °C in the magnetic force range of ±1 Tesla (T). The field dependence of the magnetization exhibits a narrow hysteresis, as shown in FIG. 7. As can be seen from FIG. 7, the saturation magnetization ($M_S$) value was found to be 45.07 electromagnetic unit per gram (emu/g) at 37 °C, which shows a ferromagnetic behavior.

Example 21: Evaluation of Antimicrobial Activity

Figure 8:
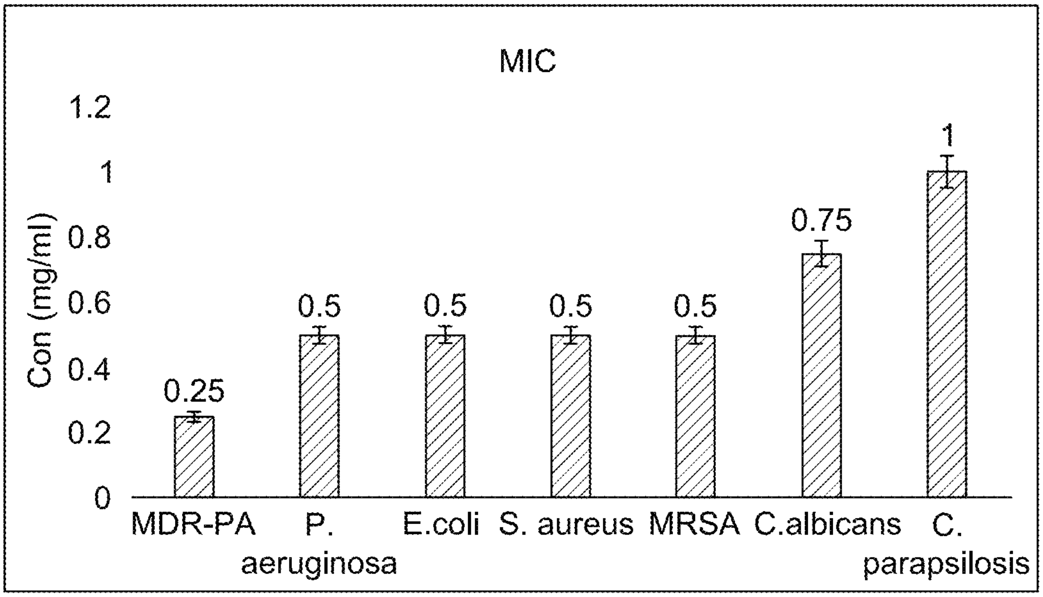
FIG. 8 shows minimum inhibitory concentration (MIC) values of $CoFe_2O_4$ NPs against various pathogens, according to certain embodiments.

The antimicrobial activity of $CoFe_2O_4$ NPs against test pathogens was determined by standard broth dilution methods. The MIC results are shown in FIG. 8. For bacterial isolates, the minimum MIC ranged from 0.25 mg/mL to 0.5 mg/mL, whereas for *Candida* spp., it was 0.75 mg/mL to 1 mg/mL. The MIC of $CoFe_2O_4$ NPs synthesized by Monascus *purpureus* exhibits a broad-spectrum antimicrobial activity against *E. coli, S. aureus, P. aeruginosa, K. pneumoniae*, and *C. albicans*, and the MIC values were found in the range of 0.25 mg/mL to 1 mg/mL. Bacteria classified as gram-positive and gram-negative have different cellular wall compositions, which have an impact on how susceptible they are to the antibacterial agents under experiment. The present disclosure shows a stronger antimicrobial activity at lower concentrations. In general, gram-positive bacteria are less sensitive to $CoFe_2O_4$ NPs, but this is because of the different particle sizes. The present disclosure suggests that $CoFe_2O_4$ NPs inhibit gram-negative bacteria *E. coli* more potently than gram-positive *S. aureus.*

Figure 9A:
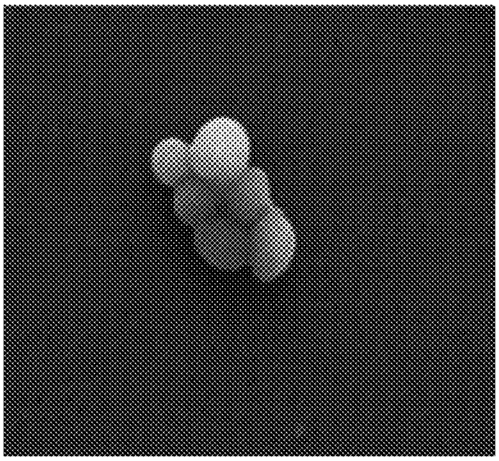
FIG. 9A shows an SEM image depicting *Candida albicans* cells in the absence of $CoFe_2O_4$ NPs, according to certain embodiments.
Figure 9B:
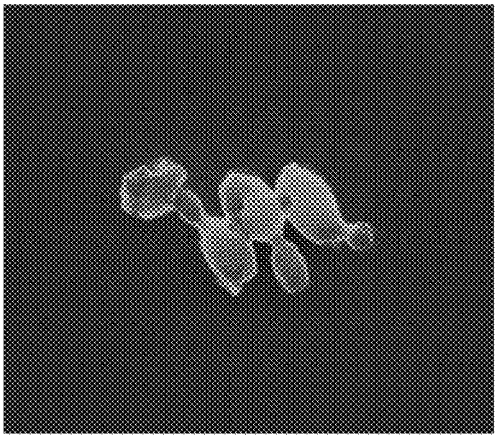
FIG. 9B shows an SEM image depicting morphological changes in *Candida albicans* cells in the presence of $CoFe_2O_4$ NPs, according to certain embodiments.

Example 22: SEM Observations of the Impacts of $CoFe_2O_4$ NPs on Test Pathogens The effects of $CoFe_2O_4$ NPs on the morphological and physiological structures of test pathogens were investigated using SEM. The untreated *C. albicans* cells had a smooth cellular structure with an intact oval shape, as shown in FIG. 9A. The *C. albicans* cells exposed to $CoFe_2O_4$ NPs had a rough and erratic cell surface, and there was severe cell damage. Additionally, the strictly damaged cells were no longer intact, which eventually led to cell death, and *C. albicans* cell numbers dropped sharply, as shown in FIG. 9B.

Figure 9C:
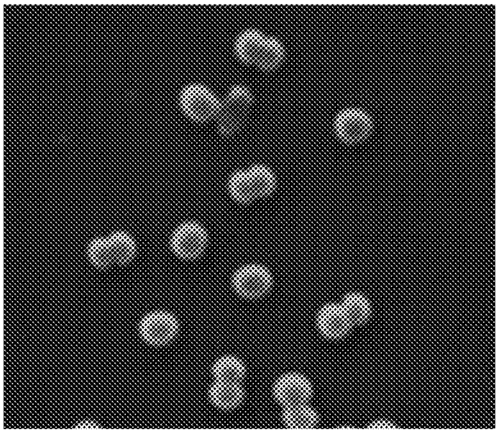
FIG. 9C shows an SEM image depicting methicillin-resistant *Staphylococcus aureus* (MRSA) cells in the absence of $CoFe_2O_4$ NPs, according to certain embodiments.
Figure 9D:
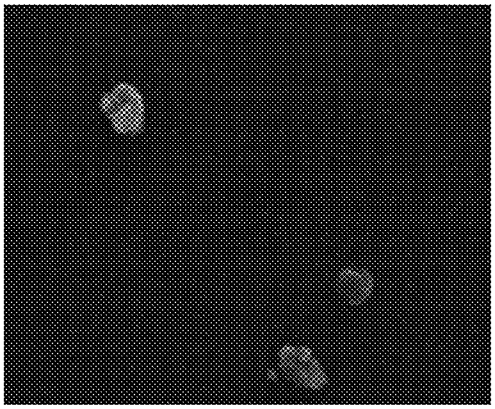
FIG. 9D shows an SEM image depicting morphological changes in MRSA cells in the presence of $CoFe_2O_4$ NPs, according to certain embodiments.
Figure 9E:
FIG. 9E shows an SEM image depicting multi-drug resistant *Pseudomonas aeruginosa* (MDR-PA) cells in the absence of $CoFe_2O_4$ NPs, according to certain embodiments.

According to research, the most plausible cause for the anticandidal action of NPs is their size, their ability to adhere to the cell surface, and their interference with ergosterol, the main sterol that sustains the integrity of the fungal cell wall. However, it was proposed that the NPs cause oxidative stress, lipid peroxidation, and hydrogen peroxide production, as well as the deactivation of cellular enzymes, which inhibit *Candida* growth or cause cell death. Similarly, the untreated control MRSA cells had a smooth cell surface exhibiting intact, regular, normal, and spherical shape, as shown in FIG. 9C. However, $CoFe_2O_4$ NP treatment of MRSA cells revealed that the microbes were damaged, and their cell number was also reduced. The cell wall and membrane were distorted, irregular, rough, and non-intact, indicating an absence of cellular membrane integrity that eventually leads to cell death, as shown in FIG. 9D. In the case of MDR-PA, the untreated MDR-PA cells had an intact, typical, and rod-shaped structure with a smooth cytoplasmic membrane, as shown in FIG. 9E.

Figure 9F:
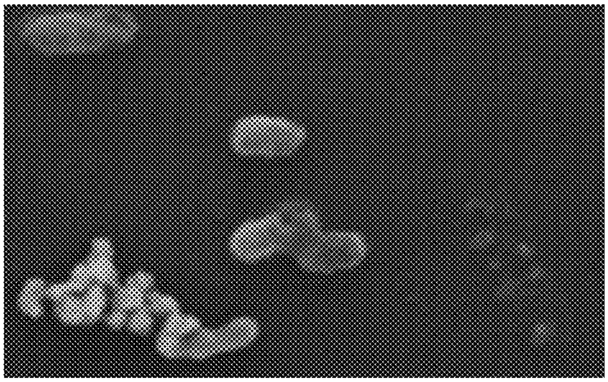
FIG. 9F shows an SEM image depicting morphological changes in MDR-PA cells in the presence of $CoFe_2O_4$ NPs, according to certain embodiments.

Furthermore, MDR-PA cells exposed to $CoFe_2O_4$ NPs demonstrated that the cells were seriously damaged, and the cell membrane and wall were non-intact, distorted, uneven, and rough, signifying an absence of cellular membrane integrity that eventually leads to cell death, as shown in FIG. 9F. Although a number of hypothesized mechanisms have been proposed, they remain speculative. Nonetheless, some recommendations may be drawn from the SEM results obtained in the present disclosure, and the possible mechanism of action is due to the direct physical contact of NPs to the cells and subsequent anchoring onto the cell walls; the production of various types of reactive oxygen species (ROS) and free radicals from the surface of metal oxide NPs; the generation of reactive oxide may cause the penetration of NPs inside the cell that may interfere with cell wall synthesis; penetration of NPs causes the rupturing of the cytoplasmic membrane that leads to the leakage of genetic materials, proteins, and minerals that cause the death of bacteria.

Figure 10:
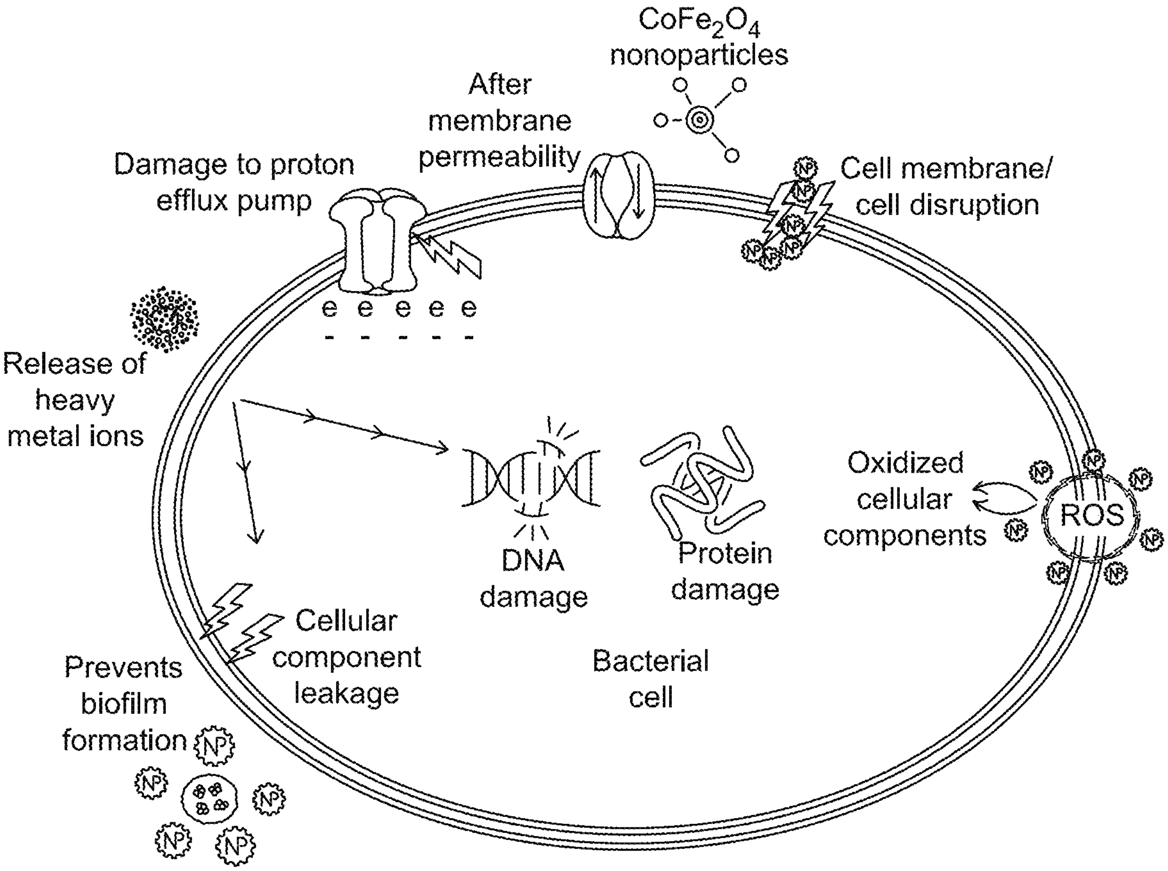
FIG. 10 is a schematic diagram depicting a possible antibacterial mechanism of $CoFe_2O_4$ NPs, according to certain embodiments.

The interaction of ferrite NPs with the cell membrane disrupts the fluid flow in the bacterial cell, resulting in cell membrane disruption that leads to the production of ROS, such as $H_2O_2$, superoxide anion, and free radicals that increase intracellular stress levels. Additionally, the Co and Fe ions enter the cell system through the interaction of the cell membrane with the $CoFe_2O_4$ NPs, interrupting normal cellular functions and causing an increase in DNA fragmentation and enzyme dysfunction. The deactivation of bacterial proteins and enzymes by the interaction of Co ions liberated from ferrite NPs with the thiol groups of bacterial enzymes causes DNA damage, which ultimately results in bacterial cell death. The possible antibacterial mechanism of $CoFe_2O_4$ NPs is illustrated in FIG. 10.

Example 23: Effect of $CoFe_2O_4$ NPs on the Biofilm-Forming Capabilities of Bacteria and *Candida*

Figure 11:
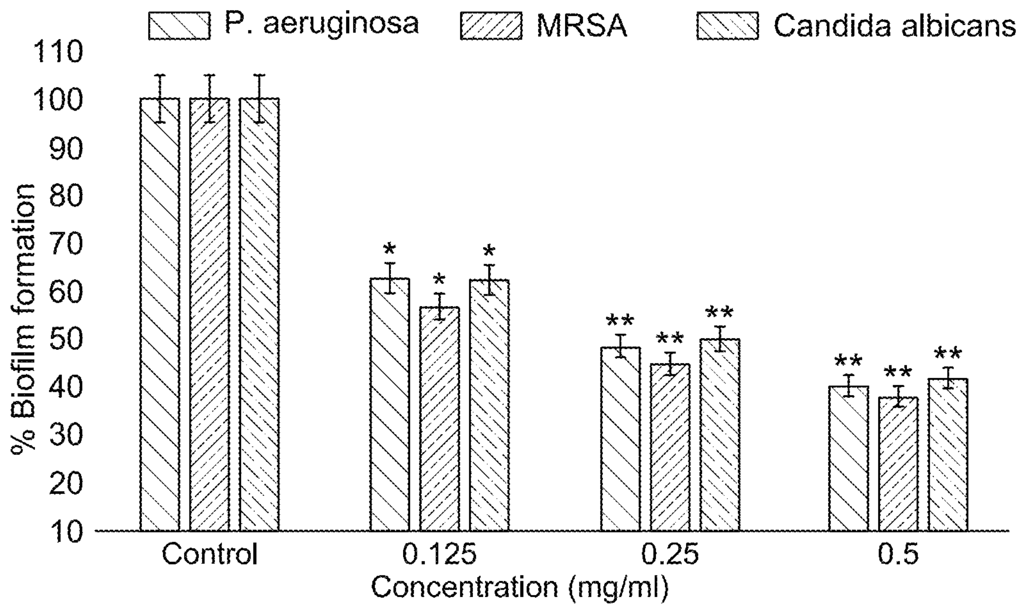
FIG. 11 shows the effect of $CoFe_2O_4$ NPs on the biofilm-forming abilities of various pathogens, according to certain embodiments.

In general, biofilm formation may cause antimicrobial resistance development. Biofilms serve as a barrier against antibiotics, and the increased metabolic rate of the bacteria encased within biofilm matrices also contributes to their antibiotic resistance. In order to eradicate biofilms, antibacterial agents must enter the bacterial cells by penetrating the polysaccharide matrix. Nano-technology may offer a solution to penetrate such biofilms and limit their development by applying nanoscale particles. In an aspect of the present disclosure, it was observed that $CoFe_2O_4$ NPs at 0.125 mg/mL, 0.25 mg/mL, and 0.5 mg/mL inhibit the biofilm formation by 37.3%, 43.3%, and 37.8% % for *P. aeruginosa,* 51.3%, 55.2%, and 49.9% for MRSA, and 59.8%, 61.8%, and 58.1% for *C. albicans*, respectively, as shown in FIG. 11.

Example 24: Eradication of the Established Biofilms by $CoFe_2O_4$ NPs

Figure 12:
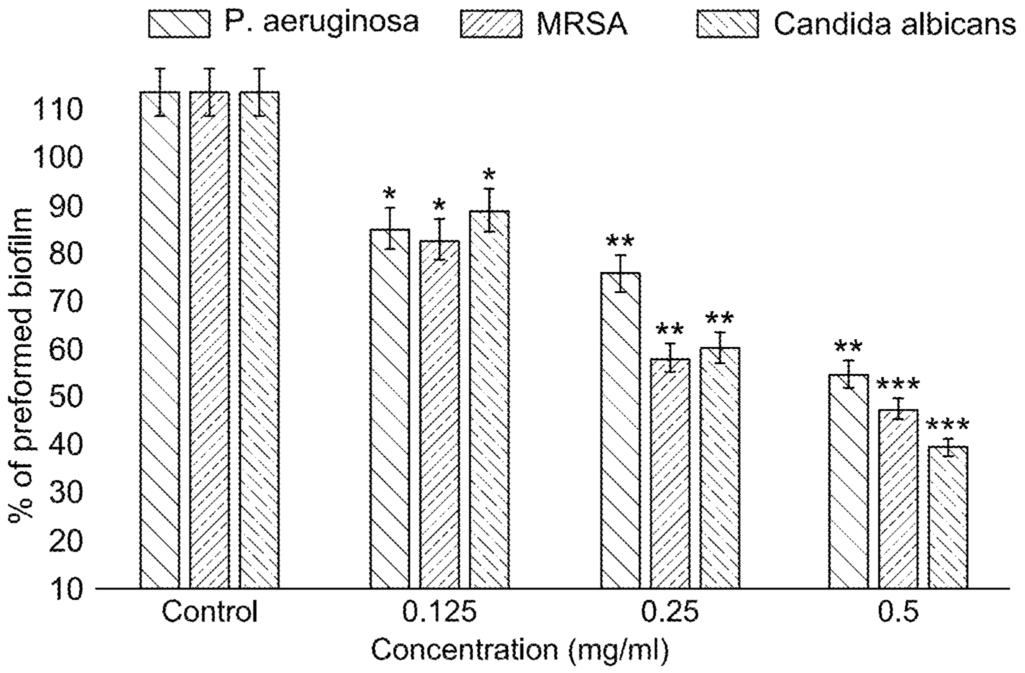
FIG. 12 shows the effect of $CoFe_2O_4$ NPs on preformed biofilms of various pathogens, according to certain embodiments.

Bacterial and candidal cells living in biofilms are more resistant to antimicrobial medications, biocides, and other chemical agents. Consequently, it is challenging to remove mature biofilms with antimicrobial treatments. In another aspect of the present disclosure, the effects of $CoFe_2O_4$ NPs on the biofilm-forming abilities of test pathogens were assessed using a quantitative assay. The results observed that $CoFe_2O_4$ NPs at 0.125 mg/mL, 0.25 mg/mL, and 0.5 mg/mL inhibited the preformed biofilm by 24.7%, 26.6%, and 21.15% for *P. aeruginosa,* 32.8%, 48.2%, and 46.2% for MRSA, and 50.9%, 57.4%, and 64.49% for *C. albicans*, respectively, as shown in FIG. 12. Based on the results obtained, the $CoFe_2O_4$ NPs have penetrated the biofilm matrix and eliminated at least 50% of the preformed biofilm of all the test pathogens at a concentration of 0.5 mg/mL. The present disclosure shows the destruction of *C. albicans* and bacterial preformed biofilms by $CoFe_2O_4$ NPs.

Example 25: SEM Examination for Visualizing the Architecture of Biofilms

Figure 13A:
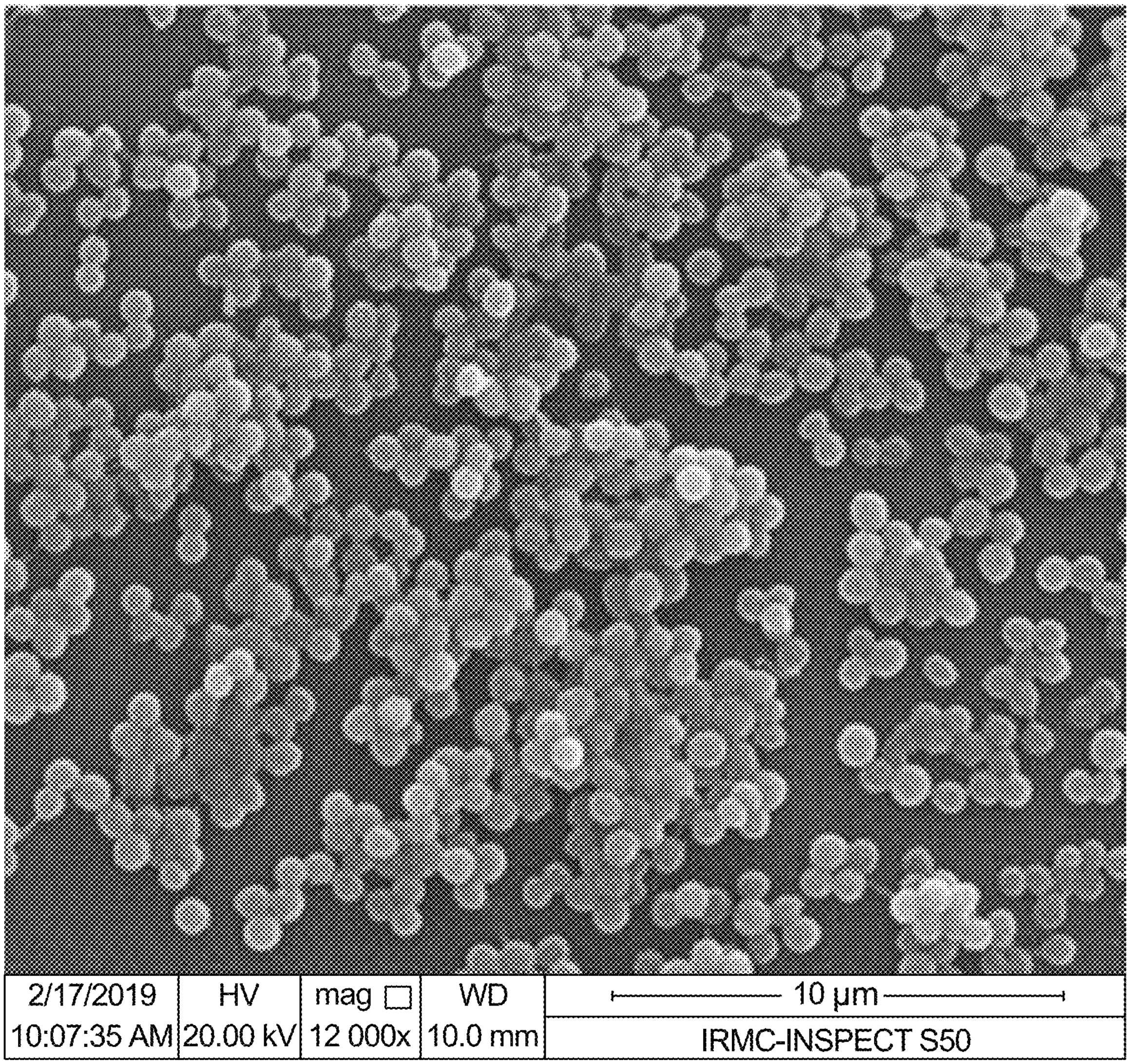
FIG. 13A is an SEM image depicting the biofilm-forming abilities of methicillin-resistant *Staphylococcus aureus* (MRSA), according to certain embodiments.
Figure 13B:
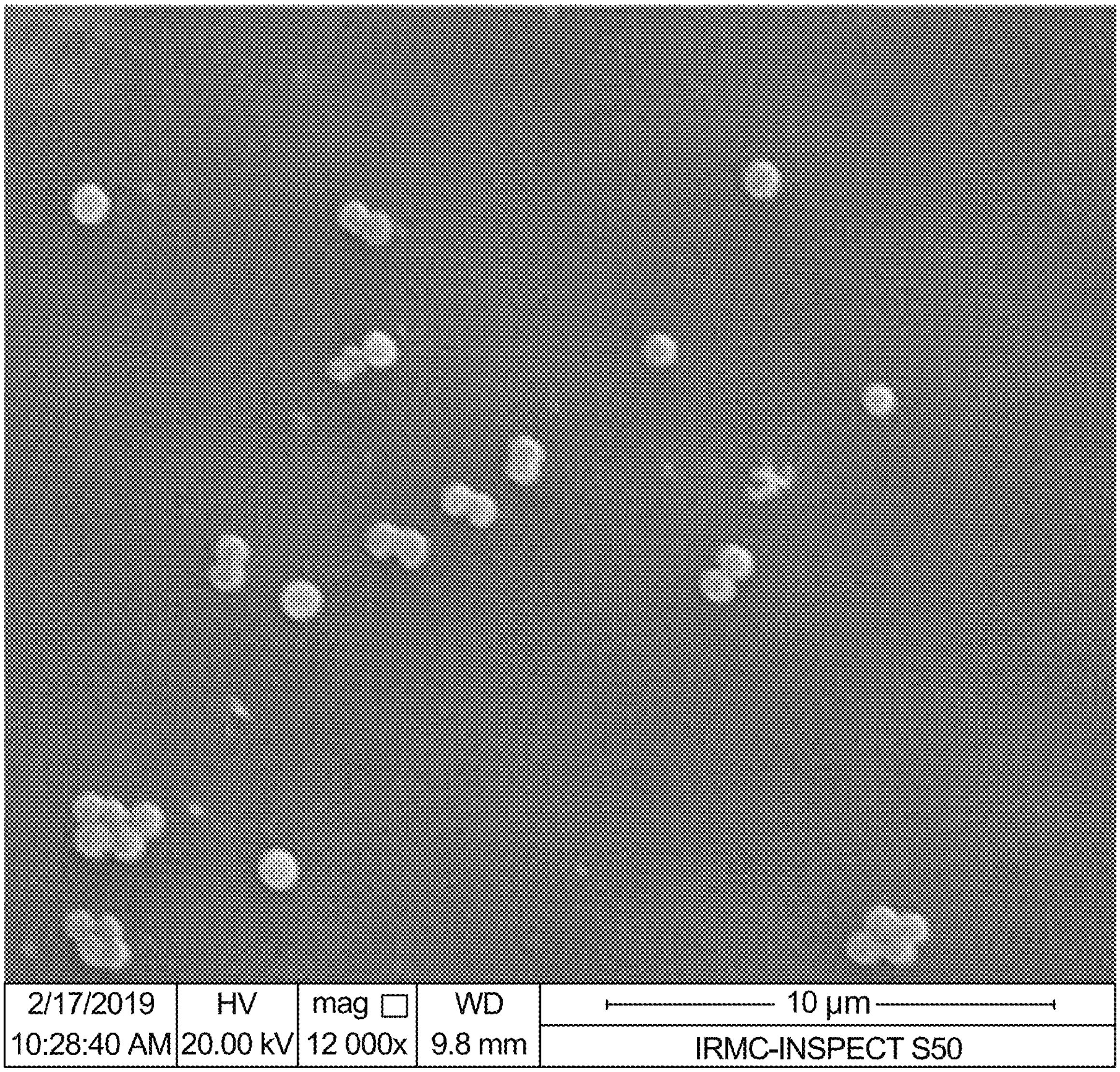
FIG. 13B is an SEM image depicting the effects of $CoFe_2O_4$ NPs on the biofilm-forming abilities of MRSA, according to certain embodiments.
Figure 13C:
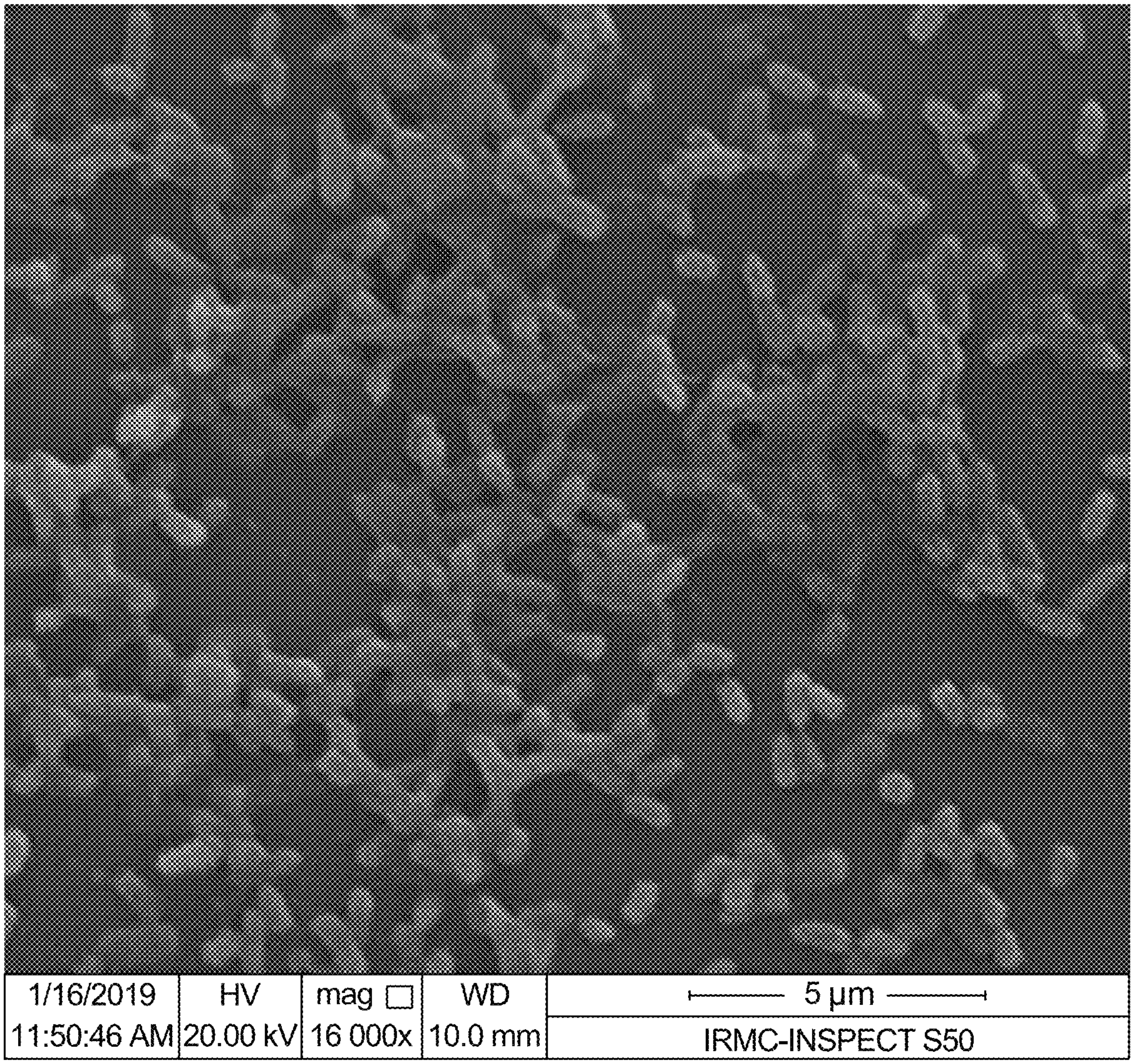
FIG. 13C is an SEM image depicting the biofilm-forming abilities of MDR-PA according to certain embodiments.
Figure 13D:
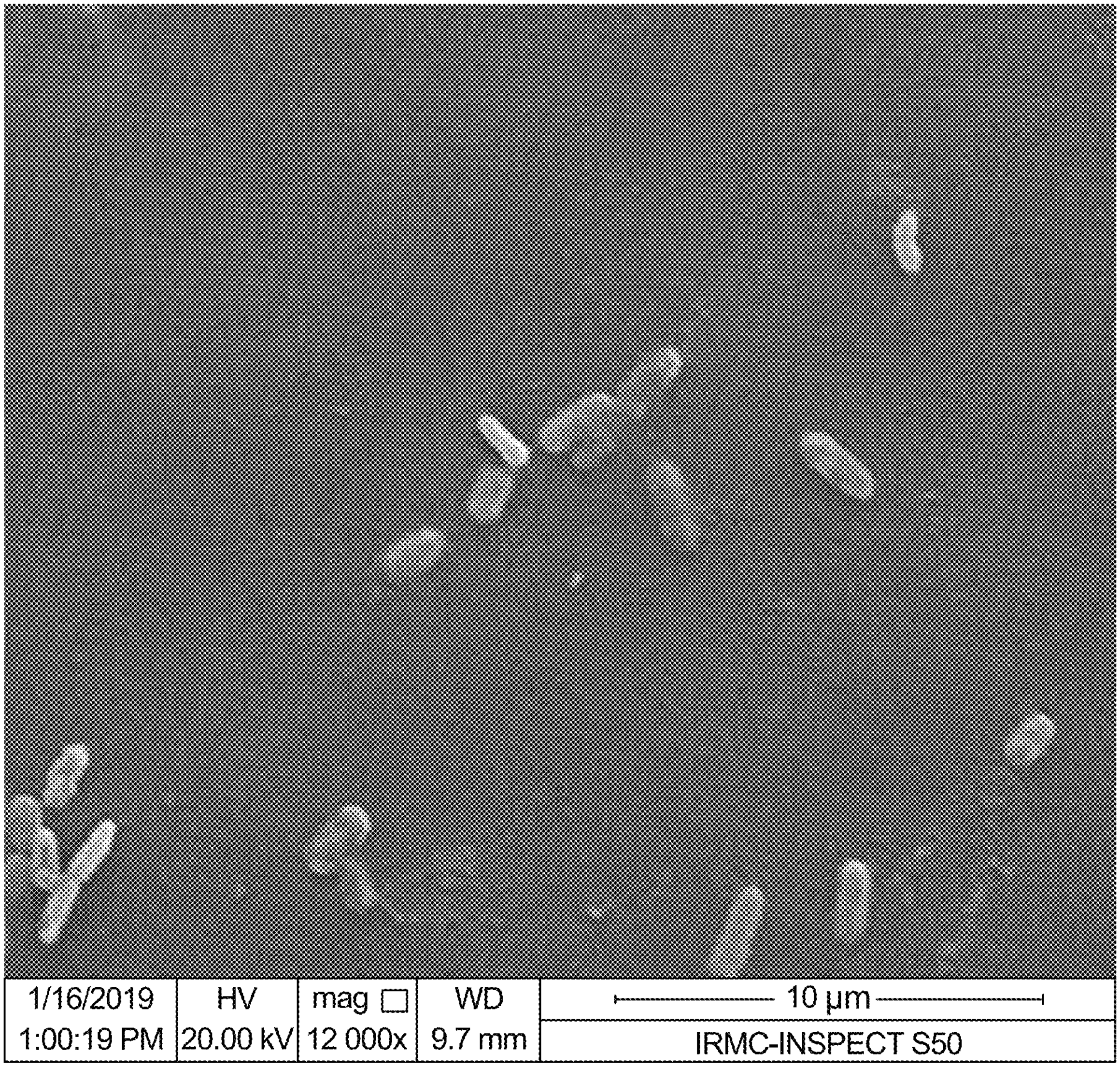
FIG. 13D is an SEM image depicting the effects of $CoFe_2O_4$ NPs on the biofilm-forming abilities of MDR-PA, according to certain embodiments.
Figure 13E:
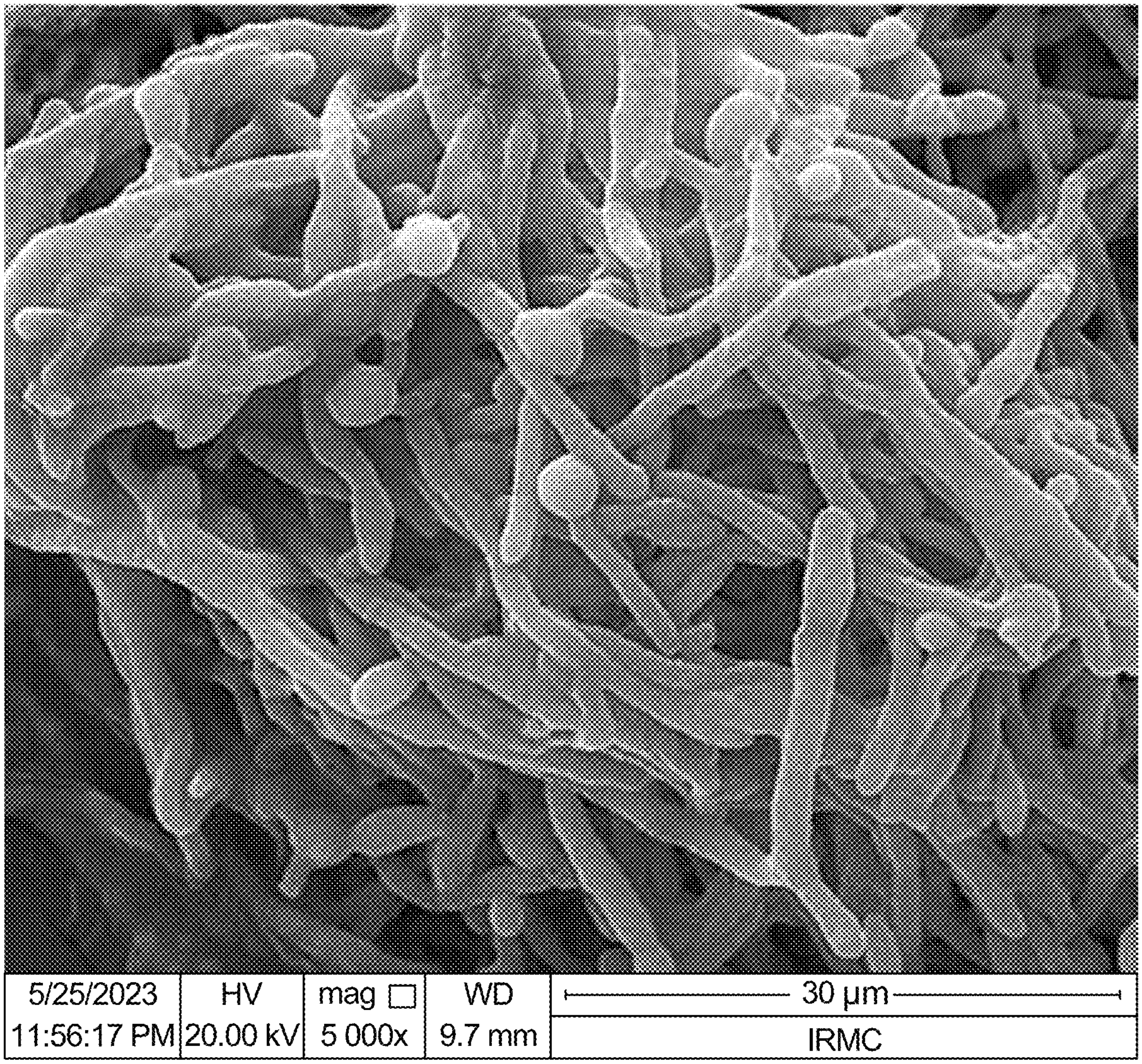
FIG. 13E is an SEM image depicting the biofilm-forming abilities of *Candida albicans* according to certain embodiments.
Figure 13F:
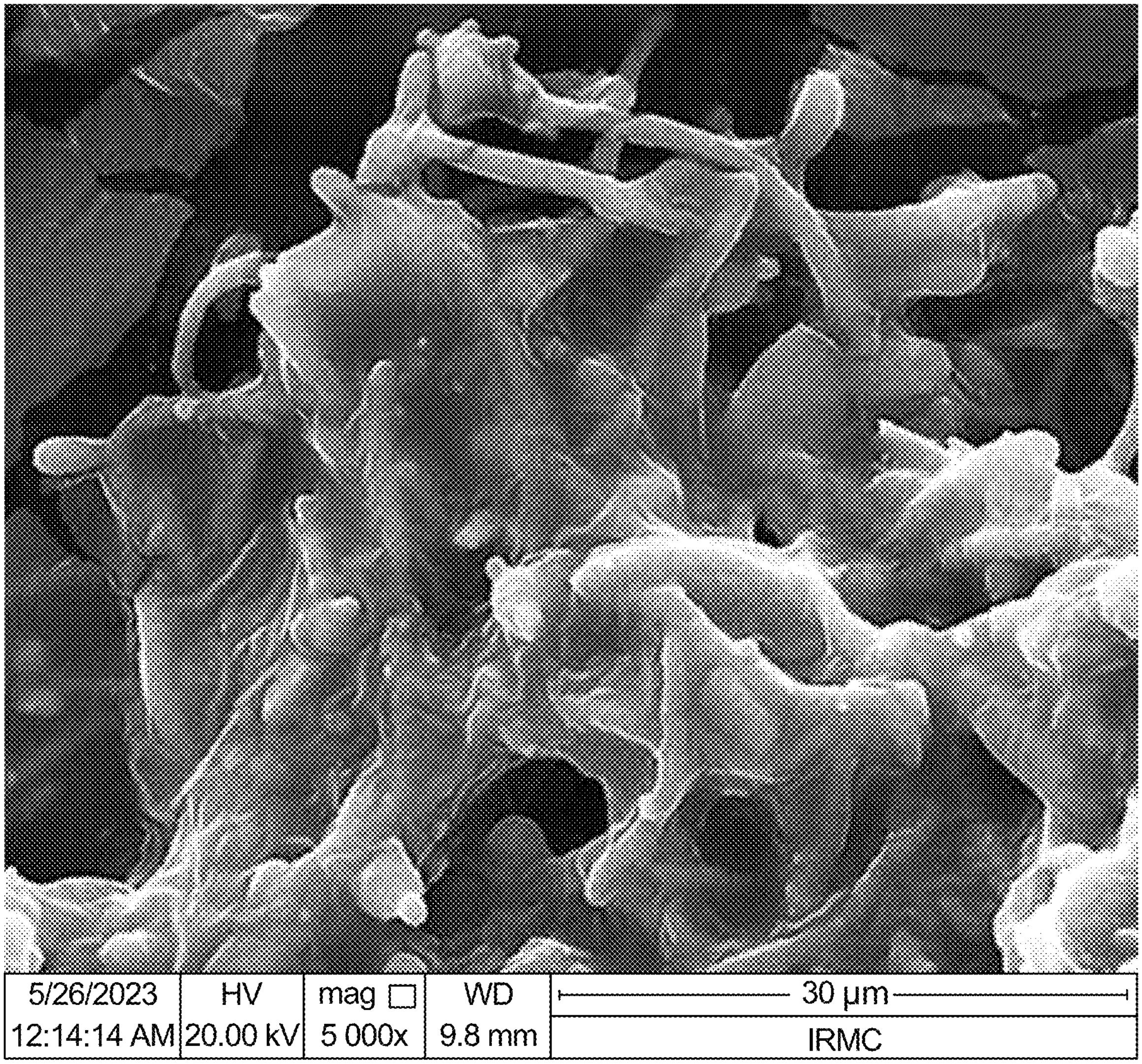
FIG. 13F is an SEM image depicting the effects of $CoFe_2O_4$ NPs on the biofilm-forming abilities of *Candida albicans*, according to certain embodiments.

FIGS. 13A-13F depicts the SEM analysis results, used to investigate the effect of $CoFe_2O_4$ NPs on the MDR-PA, MRSA, and *C. albicans* biofilms that had developed on the surface of the glass. Untreated (control) glass coverslips were discovered to be supportive of MDR-PA, MRSA, and *C. albicans* cell adhesion, colonization, and aggregation in large numbers, as shown in FIG. 13A, FIG. 13C, and FIG. 13E, respectively. The adherence and colonization of cells in MDR-PA, MRSA, and *C. albicans* biofilms treated with $CoFe_2O_4$ NPs, however, decreased, as shown in FIG. 13B, FIG. 13B, and FIG. 13F. In addition, dispersed cells that had lost their cellular structure and membrane proteins were also observed, illustrating the vicious destruction of the EPS matrix and biofilm architecture. The SEM images supports the results of the biofilm inhibition assay, and the $CoFe_2O_4$ NPs restrict bacteria and *Candida* from colonizing and aggregating, which led to a reduction of biofilm formation in the test pathogens. In general, the morphological transition of *C. albicans* between yeast and filamentous forms may contribute to its pathogenesis, and this transition is one of the prerequisites for biofilm formation. Furthermore, it has been reported that the filamentous form also affects host tissue damage and invasion. As a result, the anticandidal therapy is boosted by targeting morphological transition and dimorphism of *C. albicans.*

Figure 14A:
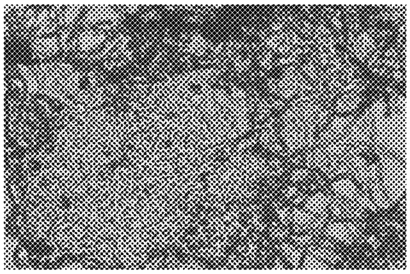
FIG. 14A is a micrograph depicting phenotypic switching, surface adhesion, and hyphal development of *C. albicans*, after 4 h of incubation without $CoFe_2O_4$ NPs, according to certain embodiments.
Figure 14B:
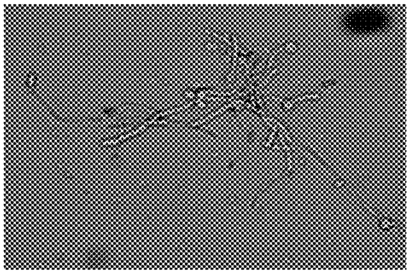
FIG. 14B is a micrograph depicting the decrease in biofilm formation and hyphal development of *C. albicans* in the presence of $CoFe_2O_4$ NPs at a concentration of 0.25 mg/mL, according to certain embodiments.
Figure 14C:
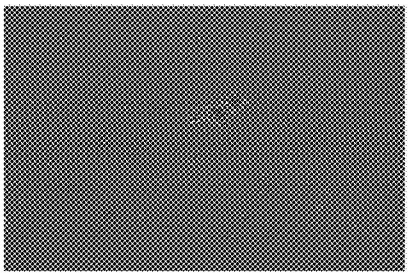
FIG. 14C is a micrograph depicting the decrease in biofilm formation and hyphal development of *C. albicans* in the presence of $CoFe_2O_4$ NPs at a concentration of 0.50 mg/mL, according to certain embodiments.
Figure 14D:
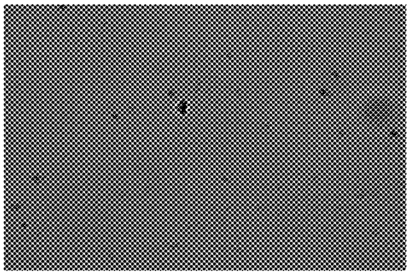
FIG. 14D is a micrograph depicting the decrease in biofilm formation and hyphal development of *C. albicans* in the presence of $CoFe_2O_4$ NPs at a concentration of 0.75 mg/mL, according to certain embodiments.

According to the present disclosure, SEM and optical light microscopy image were used to determine the effect of various doses of $CoFe_2O_4$ NP on the biofilm architecture of *C. albicans*, specifically the transition from hyphae to yeast, as shown in FIG. 13E, FIG. 13F, and FIGS. 14A-14D. Both the SEM and light micrographs revealed a distinctively dense infrastructure biofilm matrix with highly accumulated yeast and hyphal cells in control, as shown in FIG. 13E and FIG. 14A, respectively. Moreover, as can be seen from FIGS. 14B-14D, $CoFe_2O_4$ NP treatment inhibited micro-colony formation, which was primarily made up of dispersed individual cells. In addition, the true hyphae projections and hyphal network formation were also seen to drastically diminish in a dose-dependent manner, as shown in FIG. 13F and FIGS. 14B-14D.

Example 26: Impact of $CoFe_2O_4$ NPs on Cancer Cell Viability

Figure 15:
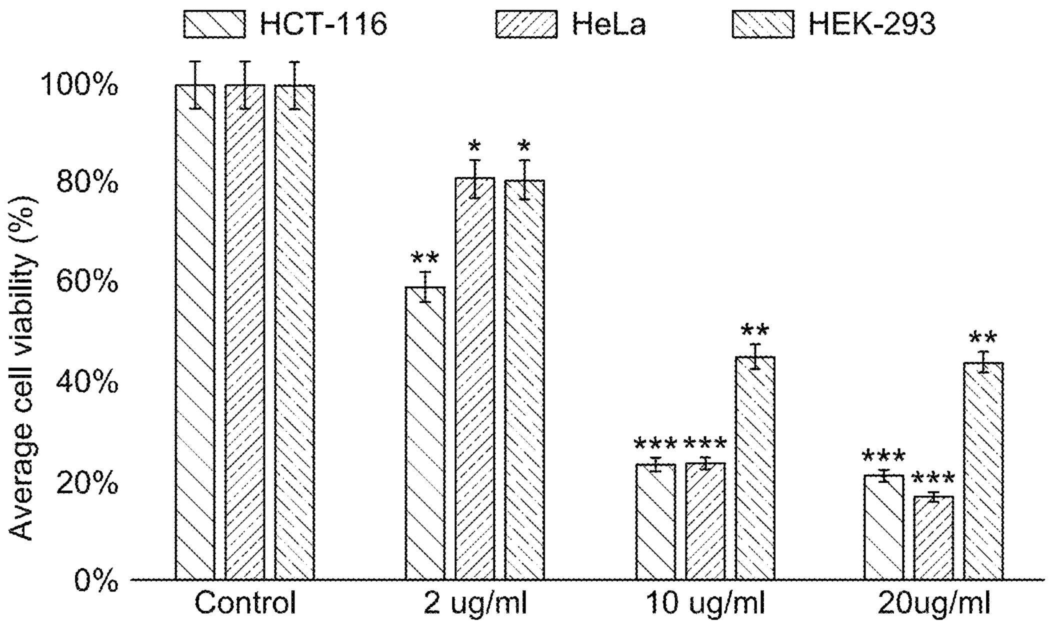
FIG. 15 shows a dose-dependent cytotoxic activity of $CoFe_2O_4$ NPs toward HCT-116, HeLa, and HEK-293 cells analyzed by 3-(4,5-dimethylthiazol-2-yl)-2,5-diphenyltetrazolium bromide (MTT assay), according to certain embodiments.

Based on their antibacterial and antifungal capabilities, $CoFe_2O_4$ NPs were further tested on two cancerous cell lines, including, HCT-116, and HeLa, and a normal non-cancerous cell, including, HEK-293, for their antiproliferative effects. As can be seen from FIG. 15, $CoFe_2O_4$ NPs dose-dependently inhibit cancer growth and proliferation. The cell viability of HCT-116 cells was 59%, 23%, and 21% when treated with $CoFe_2O_4$ NPs at concentrations of 2 μg/mL, 10 μg/mL, and 20 μg/mL, respectively. The Hela cells treated with $CoFe_2O_4$ NPs showed the cell viability of 81%, 24%, and 17% at concentrations of 2 μg/mL, 10 μg/mL, and 20 μg/mL, respectively. However, the cell viability of normal HEK-293 cells was found to be 81%, 45%, and 44% at similar doses.

Example 27: Cancer Cell DNA Disintegration

Figure 16A:
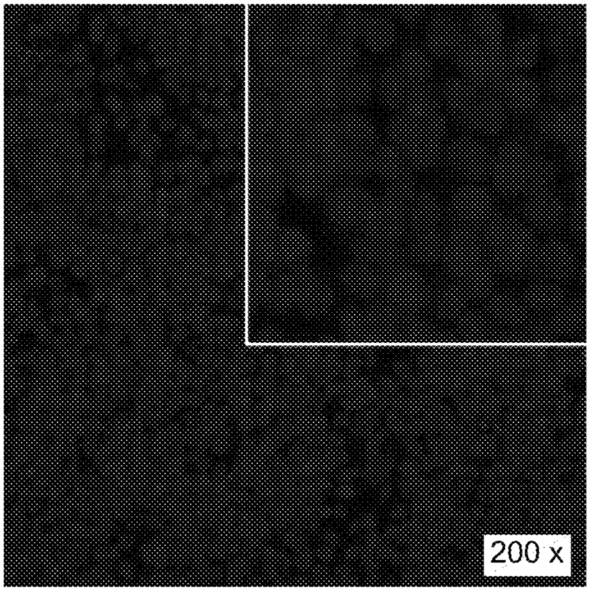
FIG. 16A shows the structure of HCT-116 cancer cells with 4',6-diamidino-2-phenylindole (DAPI) staining, according to certain embodiments.
Figure 16B:
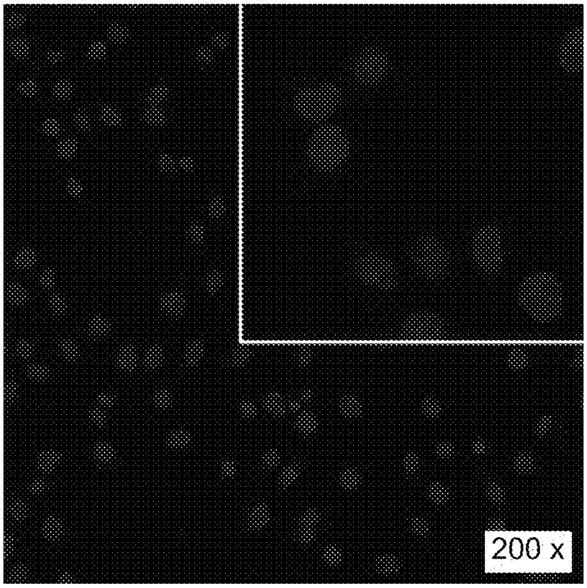
FIG. 16B shows the structure of HCT-116 cancer cells with DAPI staining after 48 h of treatment with 20 micrograms per milliliter (μg/mL) of $CoFe_2O_4$ NPs, according to certain embodiments.

The exposure of $CoFe_2O_4$ NPs to HCT-116 cells produced a substantial reduction in colon cancer cells. As can be seen from FIG. 16B, the number of DAPI-stained cells was lower in $CoFe_2O_4$ NPs-treated group compared to control cells. The control cells, as shown in FIG. 16A, showed normal and healthy cells, whereas the $CoFe_2O_4$ NP-treated cells showed nuclear disintegration and chromatic fragmentation, which are signs of apoptosis, or programmed cell death. When HCT-116 cells were treated with $CoFe_2O_4$ NPs, there were fewer colon cancer cells than there were in the control cells. Cell death, likely from apoptosis or programmed cell death, is the cause of the decline in cancer cells. Apoptotic morphological changes, such as nuclear condensation and cellular structure damage, were visible in cells treated with $CoFe_2O_4$ NPs by DAPI staining. The control cells, conversely, displayed no inhibitory action and were undamaged, retaining their typical morphological and physiological structure.

Numerous modifications and variations of the present disclosure are possible in light of the above teachings. It is therefore to be understood that within the scope of the appended claims, the invention may be practiced otherwise than as specifically described herein.

The invention claimed is:

1. A method of reducing a biofilm, comprising:

mixing a cobalt salt and an iron salt in water to form a solution;

adding an aloe vera extract to the solution and stirring for 1-10 hours (h) at a temperature of 30-80 degrees Celsius (C) to form a gel;

heating the gel to form a foam;

calcining the foam at a temperature of 600-1,000 °C for 1-3 h to form $CoFe_2O_4$ nanoparticles (NPs), and contacting the $CoFe_2O_4$ NPs with a biofilm on a surface, wherein the $CoFe_2O_4$ NPs reduce an amount of the biofilm after the contacting, wherein the $CoFe_2O_4$ NPs have an average size of 5-35 nanometers (nm), and wherein the $CoFe_2O_4$ NPs form aggregates having an average size of 500-1 micrometers (μm).

2. The method of claim 1, wherein the $CoFe_2O_4$ NPs are crystalline.

3. The method of claim 1, wherein the $CoFe_2O_4$ NPs have an inverse spinel structure.

4. The method of claim 1, wherein the $CoFe_2O_4$ NPs have a zeta potential of −15 to −20 mV.

5. The method of claim 1, wherein the $CoFe_2O_4$ NPs have a spherical shape.

6. The method of claim 1, wherein the $CoFe_2O_4$ NPs include 15-25 wt. % 0, 40-50 wt. % Fe, and 30-40 wt. % Co, based on a total weight of the $CoFe_2O_4$ NPs.

7. The method of claim 1, wherein the calcining removes phenolic compounds from a surface of the $CoFe_2O_4$ NPs, and wherein the surface of the $CoFe_2O_4$ NPs has negatively charged hydroxyl groups.

8. The method of claim 1, wherein the $CoFe_2O_4$ NPs have a saturation magnetization of 40-50 emu/g at 37 °C.

9. The method of claim 1, wherein the aloe vera extract is made by a method comprising:

cutting aloe vera leaves into pieces having a longest dimension of less than 1 cm;

mixing the pieces in water and boiling the pieces for at least 5 min to form an extract mixture; and separating the pieces from the extract mixture to form the aloe vera extract.

10. The method of claim 1, wherein in the contacting the $CoFe_2O_4$ NPs have a concentration of 0.125-1 mg per mL of the biofilm.

11. The method of claim 1, wherein on the contacting the $CoFe_2O_4$ NPs have a minimum inhibitory concentration (MIC) of 0.25-1 mg per mL of the biofilm.

12. The method of claim 1, wherein the biofilm comprises at least one selected from the group consisting of Methicillin-resistant *Staphylococcus aureus* (MRSA), *Candida albicans, Pseudomonas aeruginosa, Staphylococcus aureus, Escherichia coli*, Multidrug-Resistant *Pseudomonas aeruginosa* (MDR-PA), and *Candida parapsilosis*.

13. The method of claim 1, wherein in the contacting the $CoFe_2O_4$ NPs have a concentration of 0.5 mg/mL of the biofilm, and wherein the $CoFe_2O_4$ NPs reduce an amount of a *Candida albicans* biofilm by at least 40% 24 hours after the contacting.

14. The method of claim 1, wherein in the contacting the $CoFe_2O_4$ NPs have a concentration of 0.5 mg/mL of the biofilm, and wherein the $CoFe_2O_4$ NPs reduce an amount of a *Pseudomonas aeruginosa* biofilm by at least 40% 24 hours after the contacting.

15. The method of claim 1, wherein in the contacting the $CoFe_2O_4$ NPs have a concentration of 0.5 mg/mL of the biofilm, and wherein the $CoFe_2O_4$ NPs reduce an amount of a MRSA biofilm by at least 40% 24 hours after the contacting.

16. The method of claim 1, wherein the surface is in a hospital.

17. The method of claim 1, wherein the $CoFe_2O_4$ NPs attach to a cell surface and at least partially penetrate and distort a membrane of the cell in the biofilm leading to cell death.

18. The method of claim 1, further comprising:

functionalizing a surface of the $CoFe_2O_4$ NPs with an antibacterial compound prior to the contacting, wherein the antibacterial compound is covalently bound to the surface of the $CoFe_2O_4$ NPs.

19. The method of claim 1, further comprising:

functionalizing a surface of the $CoFe_2O_4$ NPs with a photosensitizer prior to the contacting, and irradiating the $CoFe_2O_4$ NPs with the photosensitizer after the contacting to form reactive oxygen species, wherein the photosensitizer is covalently bound to the surface of the $CoFe_2O_4$ NPs.

* * * * *